(12) United States Patent
Kiji

(10) Patent No.: US 7,401,070 B2
(45) Date of Patent: Jul. 15, 2008

(54) FLOW DATA GENERATION METHOD, FLOW DATA GENERATION APPARATUS, AND FLOW DATA GENERATION PROGRAM PRODUCT

(75) Inventor: Junichi Kiji, Urayasu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 382 days.

(21) Appl. No.: 10/762,555

(22) Filed: Jan. 23, 2004

(65) Prior Publication Data

US 2004/0205058 A1 Oct. 14, 2004

(30) Foreign Application Priority Data

Jan. 24, 2003 (JP) ............................. 2003-016294
Jan. 21, 2004 (JP) ............................. 2004-012796

(51) Int. Cl.
*G06F 17/30* (2006.01)
*G06F 7/00* (2006.01)

(52) U.S. Cl. ........................... 707/3; 707/100; 707/102; 707/104.1; 709/219

(58) Field of Classification Search ...................... 707/1, 707/102, 104.1, 100; 709/219; 715/700, 715/705

See application file for complete search history.

(56) References Cited

U.S. PATENT DOCUMENTS 6,377,259 B1 * 4/2002 Tenev et al. .................. 345/440
6,591,257 B1 * 7/2003 Martinka et al. ............... 706/46
6,975,909 B2 * 12/2005 Kluge et al. ................... 700/83

OTHER PUBLICATIONS

Fukutani Shozo, Flow Chart Preparation System and Record Medium Storing Program for Performing Processing in the Same System Through Computer, Patent Abstracts of Japan.*
"A Fast Pattern Match Algorithm for Knowledge Based systems Building Tool-EUREKA", Transactions of Information Processing Society of Japan, vol. 28, No. 12, Dec. 1987, pp. 1255-1268.
"Generation of the Highchart Program Diagrams", Transactions of Information Processing Society of Japan, vol. 31, No. 10, Oct. 1990, pp. 1463-1473.

* cited by examiner

*Primary Examiner*—John Cottingham
*Assistant Examiner*—Susan F Rayyan
(74) *Attorney, Agent, or Firm*—Foley & Lardner LLP

(57) ABSTRACT

A flow-data generation apparatus comprises a first unit extracting first binomial relation data to be a start point, a second unit associating second term of the first binomial relation data as a first child node with the start point as a first parent node, a third unit adding a relation type to an arc of the first binomial relation data, a fourth unit searching for third binomial relation data including first term of the third binomial relation data identical to second term of second binomial relation data, a fifth unit associating second term of the third binomial relation data as a second child node with the first term of the third binomial relation data as a second parent node, a sixth unit adding a relation type to an arc of the third binomial relation data, and an seventh unit repeating the searching, associating, and adding to generate a partial tree.

22 Claims, 26 Drawing Sheets

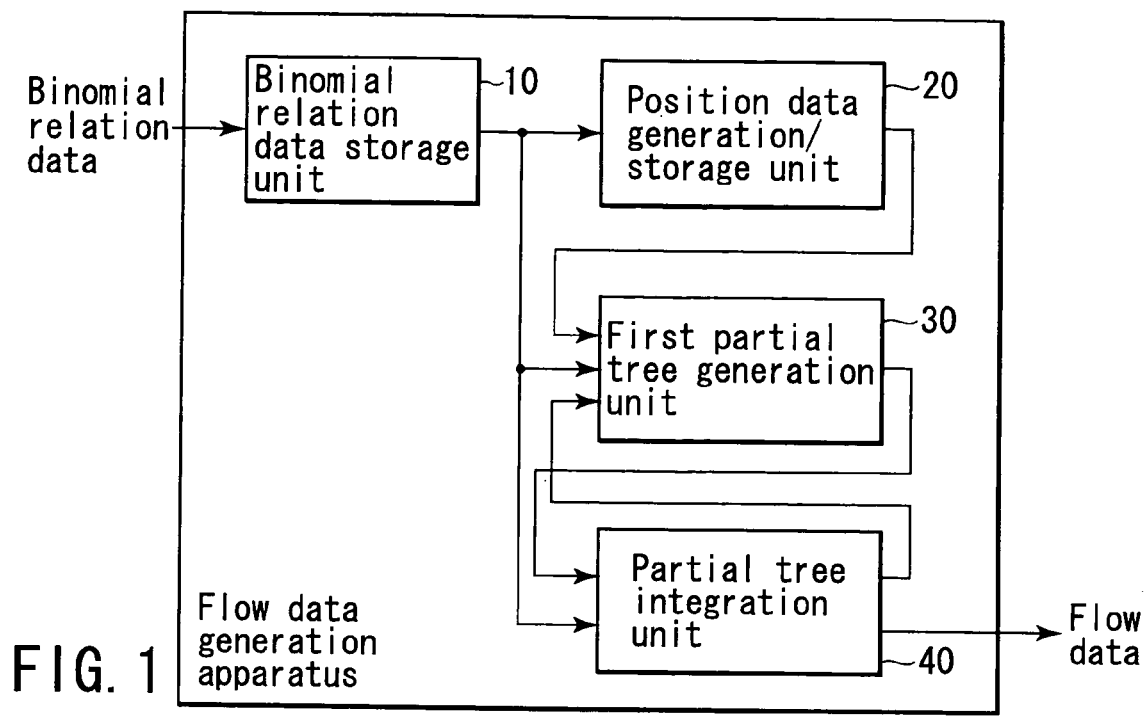

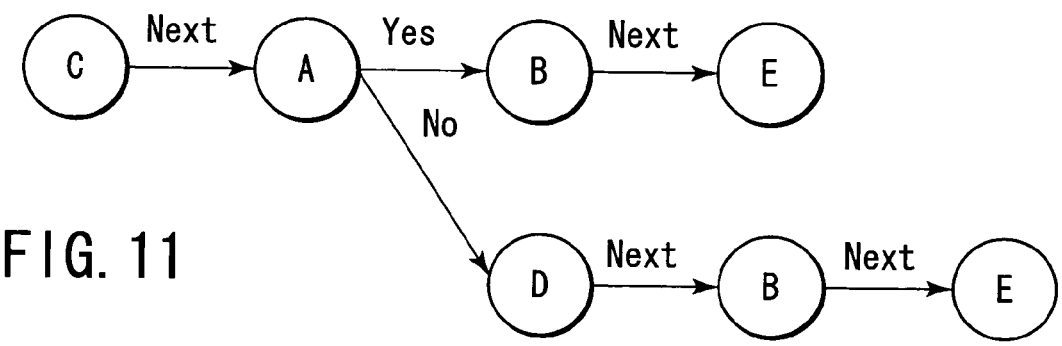
FIG. 10
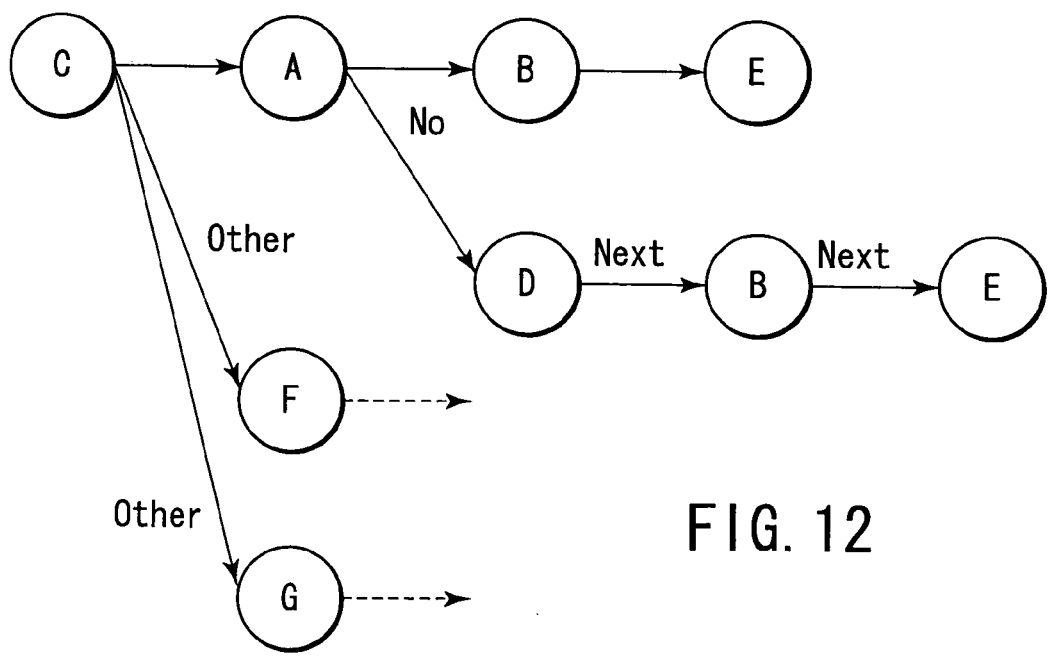
FIG. 11
FIG. 12

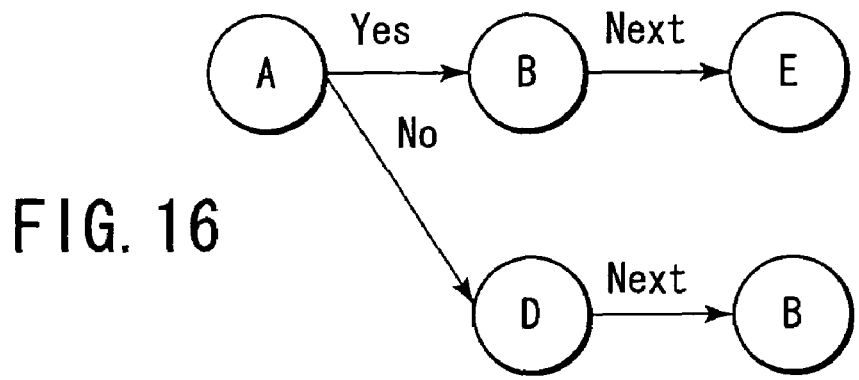
FIG. 16
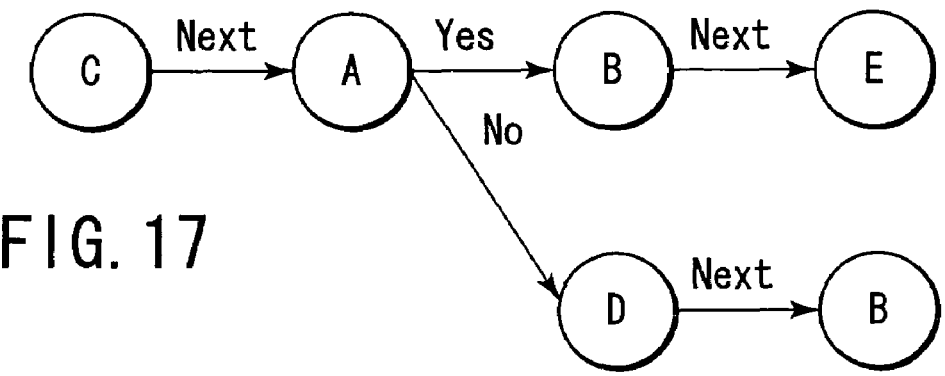
FIG. 17
Hierarchical binomial relation data
| | First term | | | Second term | | | Relation type |
|---|---|---|---|---|---|---|---|
| (1) | I | α | A | II | β | | Yes |
| (2) | I | α | C | I | α | A | Next |
| (3) | I | α | A | II | β | D | No |
| (4) | II | β | D | II | β | B | Next |
| (5) | II | β | B | II | γ | E | Next |
FIG. 18

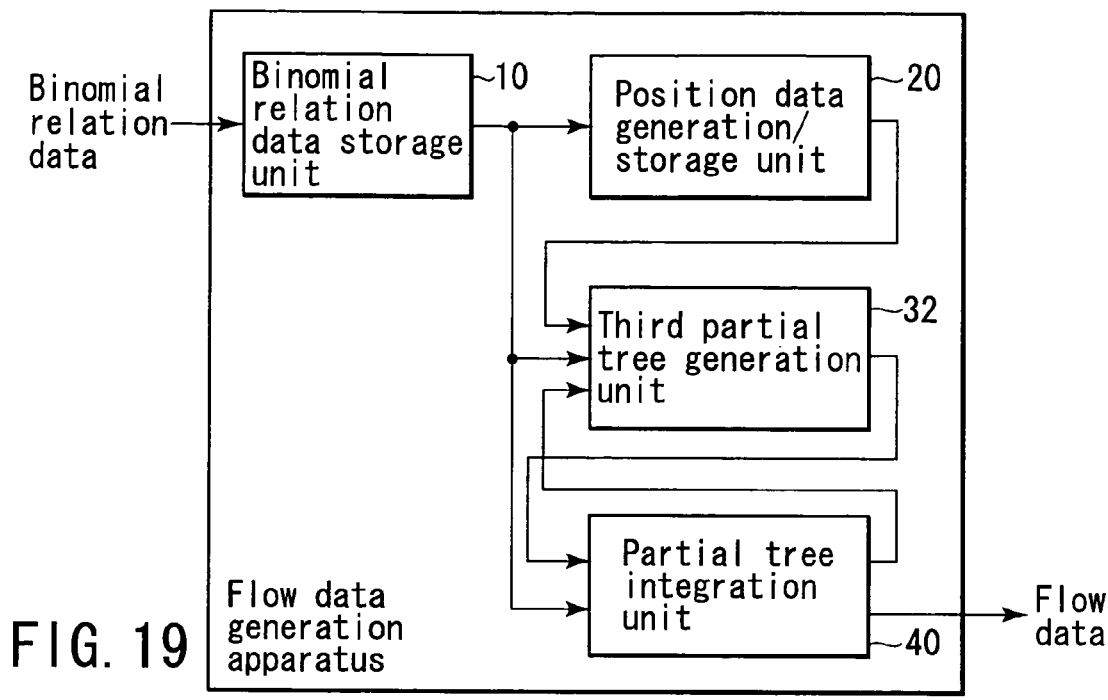
FIG. 19
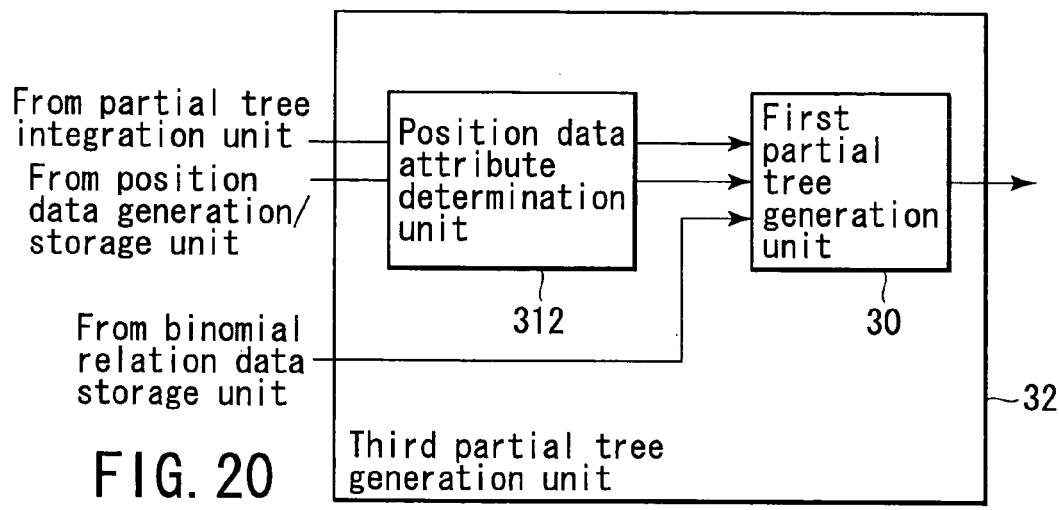
FIG. 20
| ID | | | Position data | | |
|---|---|---|---|---|---|
| I | α | A | (1, 1) | (2, 2) | (3, 1) |
| II | β | | (1, 2) | | |
| II | β | B | (4, 2) | (5, 1) | |
| I | α | C | (2, 1) | | |
| II | β | D | (3, 2) | (4, 1) | |
| II | γ | E | (5, 2) | | |
FIG. 21

|    | A | B | C | D |
|----|---|---|---|---|
| 1  | Broadcast | Digital | | 1 |
| 2  | Broadcast | Digital | | 2 |
| 3  | Broadcast | Analog | | 3 |
| 4  | | | | |
| 5  | Programming | Digital recording | | 1 |
| 6  | Digital tuner | Programming procedures | See manual | |
| 7  | Digital tuner | Programming procedures | See manual | 1 |
| 8  | | | | |
| 9  | Programming | Analog recording | Individual setting | 2 |
| 10 | Digital tuner | Playback | Channel setting | 2 |
| 11 | Recorder | Programming procedures | | 2 |
| 12 | Recorder | Programming procedures | Start time setting | 2 |
| 13 | Recorder | Programming procedures | End time setting | 2 |
| 14 | Recorder | Programming procedures | Mode setting | 2 |
| 15 | Recorder | Programming procedures | Mode setting | 2 |
| 16 | | | | |
| 17 | Programming | Analog recording | Programming code setting | 3 |
| 18 | Digital tuner | Playback | Channel setting | 3 |
| 19 | Recorder | Programming procedures | | 3 |
| 20 | Recorder | Programming procedures | Mode setting | 3 |
| 21 | Recorder | Programming procedures | Mode setting | 3 |
| 22 | | | | |

File copy / File copy operation \ Video recording programming /

Video recording programming (2)

FIG. 36A

|   | A | B | C | D |
|---|---|---|---|---|
| 1 | Broadcast | Digital | | 1 |
| 2 | Broadcast | Digital | | 2 |
| 3 | Broadcast | Analog | | 3 |
| 4 | | | | |
| 5 | Programming | Digital recording | | 1 |
| 6 | Digital tuner | Programming procedures | See manual | 1 |
| 7 | Digital tuner | Programming procedures | See manual | 1 |
| 8 | | | | |
| 9 | Programming | Analog recording | Individual setting | 2 |
| 10 | Digital tuner | Playback | Channel setting | 2 |
| 11 | Recorder | Programming procedures | | 2 |
| 12 | Recorder | Programming procedures | Start time setting | 2 |
| 13 | Recorder | Programming procedures | End time setting | 2 |
| 14 | Recorder | Programming procedures | Mode setting | 2 |
| 15 | Recorder | Programming procedures | Mode setting | 2 |
| 16 | | | | |
| 17 | ? Delete | | | |
| 18 | ? Programming | Analog recording | Programming code setting | 3 |
| 19 | Digital tuner | Playback | Channel setting | 3 |
| 20 | ? Recorder | Programming procedures | | 3 |
| 21 | ? Recorder | Programming procedures | Mode setting | 3 |
| 22 | ? Recorder | Programming procedures | Mode setting | 3 |
| 23 | | | | |
| 24 | ? Add | | Remote control programming | |
| 25 | Programming | Analog recording | | 4 |
| 26 | Digital tuner | Playback | Channel setting | 4 |
| 27 | Recorder | Programming procedures | Remote controller | 4 |
| 28 | Recorder | Programming procedures | Remote controller | 4 |
| 29 | | | | |
| 30 | Programming | Analog recording | Quick programming | 5 |
| 31 | Digital tuner | Playback | Channel setting | 5 |
| 32 | Recorder | Programming procedures | Quick | 5 |
| 33 | Recorder | Programming procedures | Quick | 5 |
| 34 | | | | |
| 35 | | | | |

FIG. 38A  Video recording programming (2)

FIG. 38

| | FIG. 38A | FIG. 38B |

385, 386, 387

| E | F | G | H | I |
|---|---|---|---|---|
| Programming | Digital recording | | | |
| Programming | Analog recording | | | |
| Programming | Analog recording | | | |
| | | | | |
| Digital tuner | Programming procedures | See manual | | |
| Digital tuner | Power | Power need not be turned off | | |
| Recorder | Power | Power need not be turned off | | |
| | | | | |
| Digital tuner | Playback | Channel setting | | |
| Recorder | Programming procedures | | | |
| Recorder | Programming procedures | Start time setting | | |
| Recorder | Programming procedures | End time setting | | |
| Recorder | Programming procedures | Mode setting | | |
| Recorder | Power | Power is turned off | | |
| Digital tuner | Power | Power is kept on | | |
| | | | | |
| Digital tuner | Playback | Channel setting | | |
| Recorder | Programming procedures | | | |
| Recorder | Programming procedures | Mode setting | | |
| Recorder | Power | Power is turned off | | |
| Digital tuner | Power | Power is kept on | | |
| | | | | |
| Digital tuner | Playback | Channel setting | | |
| Recorder | Programming procedures | Remote controller | | |
| Recorder | Power | Power is turned off | | |
| Digital tuner | Power | Power is kept on | | |
| | | | | |
| Digital tuner | Playback | Channel setting | | |
| Recorder | Programming procedures | Quick | | |
| Recorder | Power | Power is turned off | | |
| Digital tuner | Power | Power is kept on | | |

Car family

FIG. 38B

|   | A | B | C | D | E | F | G |
|---|---|---|---|---|---|---|---|
| 1 | Icon of file 1 | Highlight |   | 1) | Icon of file 1 | Highlight |   |
| 2 | Icon of file 1 | Keep Ctrl key pressed | Click | 1) | Icon of file 1 | Keep Ctrl key pressed | Click |
| 3 |   |   |   |   |   |   |   |
| 4 | Icon of file 2 | Highlight |   | 2) | Icon of file 2 | Highlight |   |
| 5 | Icon of file 2 | Keep Ctrl key pressed | Click | 2) | Icon of file 2 | Keep Ctrl key pressed | Click |
| 6 |   |   |   |   |   |   |   |
| 7 | Icon of file 3 | Highlight |   | 2) | Icon of file 3 | Highlight |   |
| 8 | Icon of file 3 | Highlight |   | 1) | Icons of files 1 to 3 | Highlight |   |
| 9 |   |   |   |   |   |   |   |
| 10 | Icons of files 1 to 3 | Highlight |   | 1) | Icons of files 1 to 3 | Mouse |   |
| 11 | Icons of files 1 to 3 | Mouse | Keep Drag | 2) | Icons of files 1 to 3 | Mouse | Keep Drag |
| 12 | Icons of files 1 to 3 | Mouse |   | 5) | Folder | Highlight |   |
| 13 |   |   |   |   |   |   |   |
| 14 | Folder | Highlight |   | 1) | Icons of files 1 to 3 | Mouse | Release |
| 15 | Icons of files 1 to 3 | Mouse | Release | 6) | Completion of copying |   |   |
| 16 | Click |   |   |   |   |   |   |
| 17 |   |   |   |   |   |   |   |

FIG. 40

FLOW DATA GENERATION METHOD, FLOW DATA GENERATION APPARATUS, AND FLOW DATA GENERATION PROGRAM PRODUCT

CROSS-REFERENCE TO RELATED APPLICATIONS

This application is based upon and claims the benefit of priority from the prior Japanese Patent Applications No. 2003-016294, filed Jan. 24, 2003; and No. 2004-012796, filed Jan. 21, 2004, the entire contents of both of which are incorporated herein by reference.

BACKGROUND OF THE INVENTION

1. Field of the Invention

The present invention relates to a flow data generation method, apparatus, and program product for creating flow data such as a flow chart, work flow, graph, and the like used in data of a work procedure manual, equipment instruction manual, and fault diagnostic system.

2. Description of the Related Art

Work procedure manuals and equipment instruction manuals concerning maintenance work are often created by compiling flow charts created by persons who have developed building components of a target equipment system. In general, building components themselves are complicated in many cases, and functional instructions for building components and the procedures of maintenance work and the like are also complicated. In many cases, a flow chart (or work flow) is used to express creation of functional instructions and maintenance work procedures. As the configuration and procedures become complicated, flow charts for explaining them also become complicated. A complicated flow chart poses a heavy burden on a person who reads the flow chart after completion. A heavy burden is also put on the creator.

Conventional methods concerning an apparatus or method which generates a flow chart considered to reduce these burdens are roughly classified into the following five categories.

(1) A language is analyzed and converted into a tree or graph (see, e.g., patent reference 1: Jpn. Pat. Appln. KOKAI Publication No. 7-182340).

(2) Node information on the graph is input and converted into a flow chart (tree structure) (see, e.g., patent references 2: Jpn. Pat. Appln. KOKAI Publication No. 4-130566, patent reference 3: Jpn. Pat. Appln. KOKAI Publication No. 9-305404, patent reference 4: Jpn. Pat. Appln. KOKAI Publication No. 9-330224, patent reference 5: Jpn. Pat. Appln. KOKAI Publication No. 7-325618, patent reference 6: Jpn. Pat. Appln. KOKAI Publication No. 2000-66884, patent reference 7: Jpn. Pat. Appln. KOKAI Publication No. 7-93158, patent reference 8: Jpn. Pat. Appln. KOKAI Publication No. 8-314725 and nonpatent references 1: "Knowledge Compiler II Based on Domain Model and Failure Model", Journal of Japanese Society for Artificial Intelligence Vol. 7, No. 4, July 1992, and nonpatent reference 2: "Generation of the Highchart Program Diagrams", Transactions of Information Processing Society of Japan Vol. 21, No. 10, October 1990 (FIG. 4)).

(3) A so-called expert system is used to define an If-Then data analysis rule and convert separately given data into a flow chart (tree or graph structure) (see, e.g., patent reference 9: Jpn. Pat. Appln. KOKAI Publication No. 4-74224 and nonpatent reference 3: "A Fast Pattern Match Algorithm for Knowledge Based Systems Building Tool—EUREKA", Transactions of Information Processing Society of Japan Vol. 28, No. 12, December 1987).

(4) The processing flow of computer program codes is converted into a flow chart (tree or graph structure) (see, e.g., patent reference 10: Jpn. Pat. Appln. KOKAI Publication No. 5-257666).

(5) A flow chart is directly created by a flow chart drawing editor (see, e.g., nonpatent reference 4: the homepage of Microsoft Visio (Microsoft) (Internet <URL: http://www.microsoft.com/>).

As described above, conventional methods are classified into the five methods (1) to (5). These methods are more roughly classified into a method of reproducing a flow chart from node data, like methods (1) to (3), and a method of prompting a person to create an entire data structure by directly utilizing the data structure of a computer program, like method (4) or plotting a data structure using a tool, like method (5). Except the use of a separately prepared data structure, like methods (4) and (5), most methods have to adopt node data expression, like methods (1) to (3). This is because a graph structure is generated using a graph theory on the basis of the ground of the graph theory that when node data (and arc data) is obtained, a graph structure is uniquely determined via an adjacency matrix.

Even with the same purpose "reproduce a flow chart from node data", methods are classified into methods (1) to (3) because of differences in application purpose or node creation method.

Method (1) assumes a natural language or a language with a grammar. The relation between a word which forms a sentence and another word is held as a rule (i.e., a grammar) in accordance with the grammatical attribute. The rule shows the relation of each word based on the attribute for a set of input words. Each word is a node, and the attribute of the word is the profile of the node. The rule interprets the profile, and searches for the chain of another node described in the profile. This method often targets data conversion in the summary of a natural language text or a structured document of XML or the like.

Method (2) creates and uses a profile (attribute) DB concerning node data itself. For example, node data is created as a domain model as shown in FIG. 9 of nonpatent document 1, and tree structure data is created in accordance with arc data (link to another node) of each node. When each node has profile data in addition to arc data, search is performed according to the condition, and thus this system is utilized as an expert system. Alternatively, to display tree data, the profile of each node describes in more detail link data to another node (also holds relational data with another node in the two-dimensional plane). Like patent reference 2, a node profile format which permits one node to have a partial graph (partial tree) is also available. As disclosed in patent references 3 to 6, each value of a data profile serves as a reference (branch node) for classifying data. The data profile is also used to variously change the data structure by changing the branch node order depending on dispersion of the profile values of data or the like. In patent references 7 and 8, not case data is directly defined as a node, but several case data are compiled into a node, thereby generating a tree structure.

Method (3) is directly related to a so-called expert system. Rules for interpreting the profile condition of each data are held, and several permutations of condition decisions are expressed by a tree structure or the like. Method (3) is basically the same as nonpatent reference 1 of method (2), but does not pose a limitation of forming each data as a node (node and arc data).

Method (4) provides an object to see program codes easily by forming data structure information of computer program codes directly into tree structure data. Tree structure (graph structure) data is not generated by chaining nodes.

Method (5) is an editor for prompting a person to create a flow chart. The creator must define nodes and their chains one by one. Similar to method (4), tree structure (graph structure) data is not generated by chaining nodes.

To facilitate creation of a flow chart (graph structure or tree structure), input work must be reduced. It is more desirable to input only node data (containing arc data) and automatically generate a data structure, like methods (1) to (3) than to describe a data structure in addition to a node, like methods (4) and (5).

However, methods (1) to (3) have the following features.

Data must be input for each node in a data structure.

Each data has attribute data in addition to chain information to another data.

The system is configured as an expert system which performs various condition decisions in addition to generation of a data structure.

Such system realizes an advanced function as represented by an expert system. However, when only a data structure is wanted to be used, input processing and utilization processing are complicated. The system cannot be easily used by many persons in different positions concerning a target.

As for details of the data structure, the conventional method assumes that nodes are exclusive in the graph theory.

An expression for processing the same content in different condition branch logics must be devised such that "an exceptional processing rule is defined, or a new node with a different label for the same content is arbitrarily set." This makes the system more inconvenient in addition to complicated handling.

Supplied information is based on the thought stream of the creator, and the user cannot always easily understand the information.

As described above, creation of flow data such as a flow chart, work flow, or graph is conventionally cumbersome. Since the flow data is created by arranging the thought stream of the creator based on each thought of the creators and expressed individually and temporarily, the user cannot always easily understand the data.

BRIEF SUMMARY OF THE INVENTION

An objective of the present invention is to provide a flow data generation method, apparatus, and program product which can generate flow data easily.

According to an aspect of the present invention, there is provided a flow data generation method which comprises (a) storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, (b) extracting first binomial relation data including first term data to be a start point of flow data from the set of binomial relation data in the first storage unit, (c) associating the start point as a first parent node with second term data of the first binomial relation data as a first child node, (d) adding a relation type of the first binomial relation data to an arc of the first binomial relation data, (e) searching the set of the binomial relation data in the first storage unit for third binomial relation data including first term data identical to second term data of second binomial relation data by referring to the position data in the second storage unit, (f) associating the first term data of the third binomial relation data as a second parent node with second term data of the third binomial relation data as a second child node, (g) adding a relation type of the third binomial relation data to an arc of the third binomial relation data, and (h) repeating the (e) searching, (f) associating, and (g) adding to generate a partial tree including a root identical to the second term data of the first binomial relation data.

According to an another aspect of the present invention, there is provided a flow data generation method which comprises (a) storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, (b) extracting first binomial relation data including first term data to be a first start point candidate of flow data from the set of binomial relation data in the first storage unit, (c) associating the first start point candidate as a first parent node with second term data of the first binomial relation data as a first child node, (d) adding a relation type of the first binomial relation data to an arc of the first binomial relation data, (e) searching the set of the binomial relation data in the first storage unit for third binomial relation data including first term data identical to second term data of the second binomial relation data by referring to the position data in the second storage unit, (f) associating the first term data of the third binomial relation data as a second parent node with second term data of the third binomial relation data as a second child node, (g) adding a relation type of the third binomial relation data to an arc of the third binomial relation data, (h) repeating the (e) searching, (f) associating, and (g) adding to generate a first partial tree including a first root identical to the second term data of the first binomial relation data, (i) generating a first data tree including a second root identical to the first start point candidate based on the first partial tree, (b') extracting fourth binomial relation data including first term data to be a second start point candidate of flow data from the set of binomial relation data in the first storage unit, (c') associating the second start point candidate as a third parent node with second term data of the fourth binomial relation data as a third child node, (d') adding a relation type of the fourth binomial relation data to an arc of the fourth binomial relation data, (h') repeating the (e) searching, (f) associating, and (g) adding to generate a second partial tree including a third root identical to the second term data of the fourth binomial relation data, (i') generating a second data tree including a fourth root identical to the second start point candidate based on the second partial tree, (j) selecting one candidate from the first and second start point candidates as the start point, and (k) associating the start point and the defeated start point candidate, adding a relation type of binomial relation data between the start point and the defeated start point candidate to an arc between the start point and the defeated start point candidate, and integrating the first and second data trees into a third data tree.

According to a still another aspect of the present invention, there is provided a flow data generation apparatus which comprises a first unit storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, a second unit extracting first binomial relation data including first term data to be a start point of flow data from the set of binomial relation data in the first storage unit, a third unit associating the start point as a first parent node with second term data of the first binomial relation data as a first child node, a fourth unit adding a relation type of the first binomial relation data to an arc of the first binomial relation data, a fifth unit searching the set of the binomial relation data in the first storage unit for third binomial relation data including first term data identical to second term data of second binomial relation data by referring to the position data in the second storage unit, a sixth unit associating the first term data of the third binomial relation data as a second parent node with second term data of the third binomial relation data as a second child node, a seventh unit adding a relation type of the third binomial relation data to an arc of the third binomial relation data, and an eighth unit repeating the searching in the fifth unit, associating in the six unit, and adding in the seventh unit to generate a partial tree including a root identical to the second term data of the first binomial relation data.

According to a still another aspect of the present invention, there is provided a flow data generation apparatus which comprises a first unit storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, a second unit extracting first binomial relation data including first term data to be a first start point candidate of flow data from the set of binomial relation data in the first storage unit, a third unit associating the first start point candidate as a first parent node with second term data of the first binomial relation data as a first child node, a fourth unit adding a relation type of the first binomial relation data to an arc of the first binomial relation data, a fifth unit searching the set of the binomial relation data in the first storage unit for third binomial relation data including first term data identical to second term data of the second binomial relation data by referring to the position data in the second storage unit, a sixth unit associating the first term data of the third binomial relation data as a second parent node with second term data of the third binomial relation data as a second child node, a seventh unit adding a relation type of the third binomial relation data to an arc of the third binomial relation data, an eighth unit repeating the searching in the fifth unit, associating in the sixth unit, and adding in the seventh unit to generate a first partial tree including a first root identical to the second term data of the first binomial relation data, a ninth unit generating a first data tree including a second root identical to the first start point candidate based on the first partial tree, a tenth unit extracting fourth binomial relation data including first term data to be a second start point candidate of flow data from the set of binomial relation data in the first storage unit, an eleventh unit associating the second start point candidate as a third parent node with second term data of the fourth binomial relation data as a third child node, a twelfth unit adding a relation type of the fourth binomial relation data to an arc of the fourth binomial relation data, a thirteenth unit repeating the searching in the fifth unit, associating in the sixth unit, and adding in the seventh unit to generate a second partial tree including a third root identical to the second term data of the fourth binomial relation data, a fourteenth unit generating a second data tree including a fourth root identical to the second start point candidate based on the second partial tree, a fifteenth unit selecting one candidate from the first and second start point candidates as the start point, and a sixteenth unit associating the start point and the defeated start point candidate, adding a relation type of binomial relation data between the start point and the defeated start point candidate to an arc between the start point and the defeated start point candidate, and integrating the first and second data trees into a third data tree.

According to a still another aspect of the present invention, there is provided a flow data generation apparatus which comprises a processor, a storage device which can be accessed by the processor, a first program code which is stored in the storage device and provides the processor with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, a second program code which is stored in the storage device and provides the processor with a command to extract first binomial relation data including first term data to be a start point of flow data from the set of binomial relation data in the first storage unit, a third program code which is stored in the storage device and provides the processor with a command to associate the start point as a first parent node with second term data of the first binomial relation data as a first child node, a fourth program code which is stored in the storage device and provides the processor with a command to add a relation type of the first binomial relation data to an arc of the first binomial relation data, a fifth program code which is stored in the storage device and provides the processor with a command to search the set of the binomial relation data in the first storage unit for third binomial relation data including first term data identical to second term data of second binomial relation data by referring to the position data in the second storage unit, a sixth program code which is stored in the storage device and provides the processor with a command to associate the first term data of the third binomial relation data as a second parent node with second term data of the third binomial relation data as a second child node, a seventh program code which is stored in the storage device and provides the processor with a command to add a relation type of the third binomial relation data to an arc of the third binomial relation data, and an eighth program code which is stored in the storage device and provides the processor with a command to repeat the searching by the fifth program code, associating by the six program code, and adding by the seventh program code to generate a partial tree including a root identical to the second term data of the first binomial relation data.

According to a still another aspect of the present invention, there is provided a flow data generation apparatus which comprises a processor, a storage device which can be accessed by the processor, a first program code which is stored in the storage device and provides the processor with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, a second program code which is stored in the storage device and provides the processor with a command to extract first binomial relation data including first term data to be a first start point candidate of flow data from the set of binomial relation data in the first storage unit, a third program code which is stored in the storage device and provides the processor with a command to associate the first start point candidate as a first parent node with second term data of the first binomial relation data as a first child node, a fourth program code which is stored in the storage device and provides the processor with a command to add a relation type of the first binomial relation data to an arc of the first binomial relation data, a fifth program code which is stored in the storage device and provides the processor with a command to search the set of the binomial relation data in the first storage unit for third binomial relation data including first term data identical to second term data of the second binomial relation data by referring to the position data in the second storage unit, a sixth program code which is stored in the storage device and provides the processor with a command to associate the first term data of the third binomial relation data as a second parent node with second term data of the third binomial relation data as a second child node, a seventh program code which is stored in the storage device and provides the processor with a command to add a relation type of the third binomial relation data to an arc of the third binomial relation data, an eighth program code which is stored in the storage device and provides the processor with a command to repeat the searching by the fifth program code, associating by the sixth program code, and adding by the seventh program code to generate a first partial tree including a first root identical to the second term data of the first binomial relation data, a ninth program code which is stored in the storage device and provides the processor with a command to generate a first data tree including a second root identical to the first start point candidate based on the first partial tree, a tenth program code which is stored in the storage device and provides the processor with a command to extract fourth binomial relation data including first term data to be a second start point candidate of flow data from the set of binomial relation data in the first storage unit, an eleventh program code which is stored in the storage device and provides the processor with a command to associate the second start point candidate as a third parent node with second term data of the fourth binomial relation data as a third child node, a twelfth program code which is stored in the storage device and provides the processor with a command to add a relation type of the fourth binomial relation data to an arc of the fourth binomial relation data, a thirteenth program code which is stored in the storage device and provides the processor with a command to repeat the searching by the fifth program code, associating by the sixth program code, and adding by the seventh program code to generate a second partial tree including a third root identical to the second term data of the fourth binomial relation data, a fourteenth program code which is stored in the storage device and provides the processor with a command to generate a second data tree including a fourth root identical to the second start point candidate based on the second partial tree, a fifteenth program code which is stored in the storage device and provides the processor with a command to select one candidate from the first and second start point candidates as the start point, and a sixteenth program code which is stored in the storage device and provides the processor with a command to associate the start point and the defeated start point candidate, add a relation type of binomial relation data between the start point and the defeated start point candidate to an arc between the start point and the defeated start point candidate, and integrate the first and second data trees into a third data tree.

According to a still another aspect of the present invention, there is provided a flow data generation program product causing a computer system to generate flow data, which comprises a recording medium, a first program code which is recorded on the recording medium and provides the computer system with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, a second program code which is recorded on the recording medium and provides the computer system with a command to extract first binomial relation data including first term data to be a start point of flow data from the set of binomial relation data in the first storage unit, a third program code which is recorded on the recording medium and provides the computer system with a command to associate the start point as a first parent node with second term data of the first binomial relation data as a first child node, a fourth program code which is recorded on the recording medium and provides the computer system with a command to add a relation type of the first binomial relation data to an arc of the first binomial relation data, a fifth program code which is recorded on the recording medium and provides the computer system with a command to search the set of the binomial relation data in the first storage unit for third binomial relation data including first term data identical to second term data of second binomial relation data by referring to the position data in the second storage unit, a sixth program code which is recorded on the recording medium and provides the computer system with a command to associate the first term data of the third binomial relation data as a second parent node with second term data of the third binomial relation data as a second child node, a seventh program code which is recorded on the recording medium and provides the computer system with a command to add a relation type of the third binomial relation data to an arc of the third binomial relation data, and an eighth program code which is recorded on the recording medium and provides the computer system with a command to repeat the searching by the fifth program code, associating by the six program code, and adding by the seventh program code to generate a partial tree including a root identical to the second term data of the first binomial relation data.

According to a still another aspect of the present invention, there is provided a flow data generation program product which causing a computer system to generate flow data, which comprises a recording medium, a first program code which is recorded on the recording medium and provides the computer system with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit, a second program code which is recorded on the recording medium and provides the computer system with a command to extract first binomial relation data including first term data to be a first start point candidate of flow data from the set of binomial relation data in the first storage unit, a third program code which is recorded on the recording medium and provides the computer system with a command to associate the first start point candidate as a first parent node with second term data of the first binomial relation data as a first child node, a fourth program code which is recorded on the recording medium and provides the computer system with a command to add a relation type of the first binomial relation data to an arc of the first binomial relation data, a fifth program code which is recorded on the recording medium and provides the computer system with a command to search the set of the binomial relation data in the first storage unit for third binomial relation data including first term data identical to second term data of the second binomial relation data by referring to the position data in the second storage unit, a sixth program code which is recorded on the recording medium and provides the computer system with a command to associate the first term data of the third binomial relation data as a second parent node with second term data of the third binomial relation data as a second child node, a seventh program code which is recorded on the recording medium and provides the computer system with a command to add a relation type of the third binomial relation data to an arc of the third binomial relation data, an eighth program code which is recorded on the recording medium and provides the computer system with a command to repeat the searching by the fifth program code, associating by the sixth program code, and adding by the seventh program code to generate a first partial tree including a first root identical to the second term data of the first binomial relation data, a ninth program code which is recorded on the recording medium and provides the computer system with a command to generate a first data tree including a second root identical to the first start point candidate based on the first partial tree, a tenth program code which is recorded on the recording medium and provides the computer system with a command to extract fourth binomial relation data including first term data to be a second start point candidate of flow data from the set of binomial relation data in the first storage unit, an eleventh program code which is recorded on the recording medium and provides the computer system with a command to associate the second start point candidate as a third parent node with second term data of the fourth binomial relation data as a third child node, a twelfth program code which is recorded on the recording medium and provides the computer system with a command to add a relation type of the fourth binomial relation data to an arc of the fourth binomial relation data, a thirteenth program code which is recorded on the recording medium and provides the computer system with a command to repeat the searching by the fifth program code, associating by the sixth program code, and adding by the seventh program code to generate a second partial tree including a third root identical to the second term data of the fourth binomial relation data, a fourteenth program code which is recorded on the recording medium and provides the computer system with a command to generate a second data tree including a fourth root identical to the second start point candidate based on the second partial tree, a fifteenth program code which is recorded on the recording medium and provides the computer system with a command to select one candidate from the first and second start point candidates as the start point, and a sixteenth program code which is recorded on the recording medium and provides the computer system with a command to associate the start point and the defeated start point candidate, add a relation type of binomial relation data between the start point and the defeated start point candidate to an arc between the start point and the defeated start point candidate, and integrate the first and second data trees into a third data tree.

BRIEF DESCRIPTION OF THE SEVERAL VIEWS OF THE DRAWING

FIG. 1 is a block diagram showing a configuration example of a flow data generation apparatus according to the first embodiment of the present invention;

FIG. 2 is a table showing a binomial relation data table stored in a binomial relation data storage unit according to the first embodiment;

FIG. 3 is a table showing a position data table stored in a position data generation/storage unit according to the first embodiment;

FIG. 4 is a table showing another example of the position data table according to the first embodiment;

FIG. 10 is a view showing an example of an adjacency matrix according to the first embodiment;

FIG. 11 is a view showing an example of flow data according to the first embodiment;

FIG. 12 is a view showing another example of flow data according to the first embodiment;

FIG. 16 is a view showing an example of a partial tree generated by the second partial tree generation unit according to the second embodiment;

FIG. 17 is a view showing an example of flow data according to the second embodiment;

FIG. 18 is a table showing a binomial relation data table stored in a binomial relation data storage unit according to the second embodiment;

FIG. 19 is a block diagram showing a configuration example of a flow data generation apparatus according to the third embodiment of the present invention;

FIG. 20 is a block diagram showing a configuration example of the third partial tree generation unit according to the third embodiment;

FIG. 21 is a table showing a position data table stored in a position data generation/storage unit according to the third embodiment;

FIGS. 36A and 36B are views showing binomial relation data of procedures regarding some of programming procedures which assume a digital video recorder according to the eighth embodiment of the present invention;

FIGS. 38A and 38B are views showing binomial relation data from which some of the binomial relation data of FIGS. 36A and 36B are deleted according to the eighth embodiment;

FIG. 40 is a view showing operation instructions 1 to 7 as binomial relation data in an interactive instruction system according to the ninth embodiment of the present invention;

DETAILED DESCRIPTION OF THE INVENTION

Figure 5:
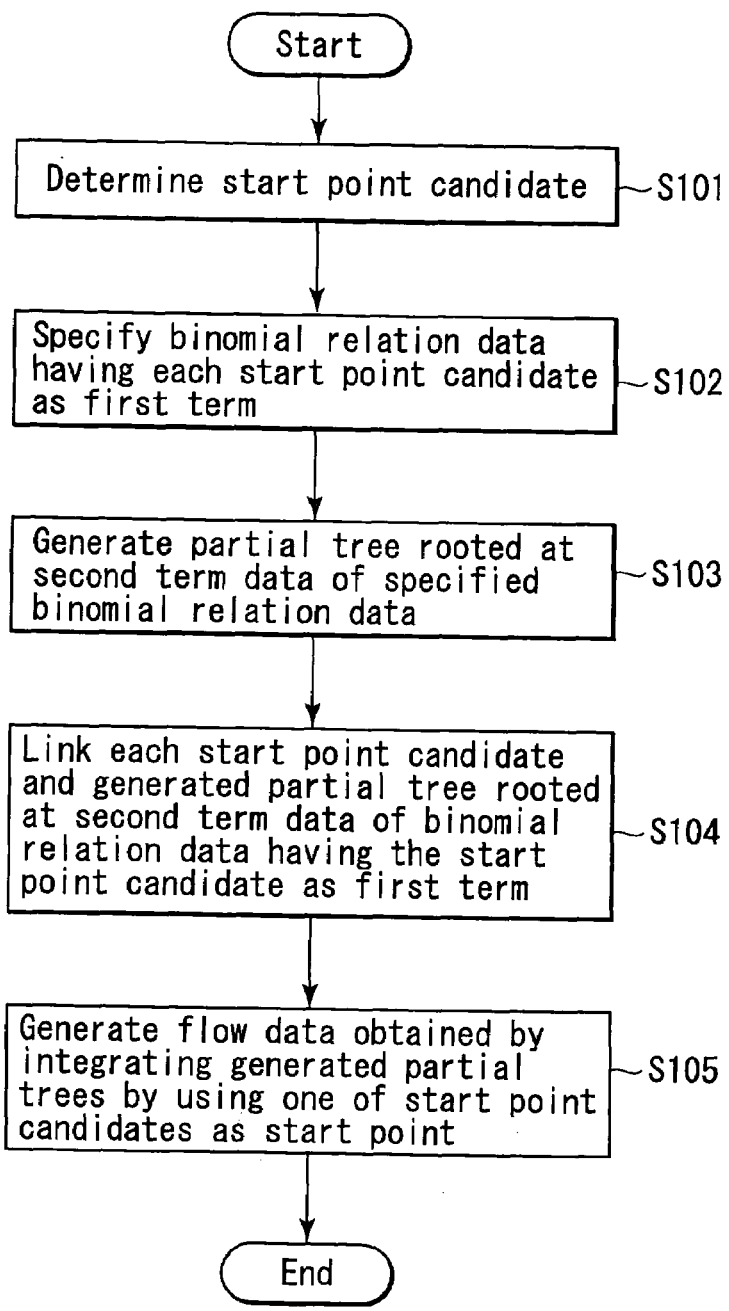
FIG. 5 is a flow chart showing processing operation of the flow data generation apparatus according to the first embodiment.

Preferred embodiments of the present invention will be described below with reference to the several views of the accompanying drawing.

First Embodiment

FIG. 1 is a block diagram showing a configuration example of a flow data generation apparatus according to the first embodiment. The flow data generation apparatus 1 comprises a binomial relation storage unit 10, position data generation/storage unit 20, first partial tree generation unit 30, and partial tree integration unit 40.

The configuration and function of the flow data generation apparatus 1 in FIG. 1 will be explained.

The binomial relation data storage unit 10 stores the causal relation and order relation concerned with a plurality of physical phenomena and a plurality of devices as a data set expressed by a binomial format. For example, as a maintenance work, the following procedures such as (x1) to (x5) will be given on the assumption that a series of maintenance work procedures on a given target are expressed on the basis of data A to E corresponding to conditions, processes, and the like.

(x1) If condition decision A is satisfied, the procedure shifts to processing B.

(x2) Processing C is performed, and the procedure shifts to condition decision processing A.

(x3) If condition decision A is not satisfied, the procedure shifts to processing D.

(x4) The procedure shifts to processing B after processing D.

(x5) The procedure shifts to processing E after processing B.

In this case, the data A to E are information data representing parts, functions, work (e.g., maintenance), actions, or the like. For descriptive convenience, these data will be simply referred to as the data A to E regardless of the data contents in order to discriminate the data to be processed.

The binomial relation data storage unit 10 stores a series of procedures like (x1) to (x5) as a binomial data set.

FIG. 2 is a table showing an example of the data set expression. Each row (from the first to fifth rows) in FIG. 2 corresponds to binomial relation data representing "binomial relation". The binomial relation data is comprised of the first and second term data representing so-called "binomial relation", and data representing the type of correspondence (type of binomial relation) between the first and second term data (e.g., from the first term data to the second term data).

For example, the correspondence type is "Yes" in which the flow shifts to the second term data when a condition expressed by the first term data is satisfied. The correspondence type is "No" in which the flow shifts to the second term data when a condition expressed by the first term data is not satisfied. The correspondence type is "Next" in which the flow shifts to the second term data regardless of the condition (Yes or No) of the first term (unconditionally after the first term) such as binomial relation data in the second, fourth, and fifth rows.

The position data generation/storage unit 20 arranges and stores which of the binomial relation data in the plurality of the binomial relation data shown in FIG. 2 the first and second term data serving as constituent elements of relational data stored in the binomial relation data storage unit 10 appear and where the first and second term data appear in the plurality of the binomial relation data shown in FIG. 2 (first or second term).

"A" to "E" are identifiers (IDs) or labels which correspond to and identify the data A to E.

As an explanation using the binomial relation data in FIG. 2, the position data generation/storage unit 20 converts all the data A to E which appear in a plurality of binomial relation data in the binomial relation data into a format as shown in FIG. 3. For example, in the data table shown in FIG. 2, the data A appears in the first term of the first row, the second term of the second row, and the first term of the third row. Therefore, as shown in FIG. 3, the appearance position of the data A expresses, by a coordinate format of, the number (row number) of binomial relation data stored in the binomial relation data storage unit 10 and the position (first or second column) in the binomial relation data such as (1,1), (2,2), and (3,1). These data will be called position data corresponding to the data A.

In this way, position data corresponding to the data B to E are created and stored in the position data generation/storage unit 20 as shown in FIG. 3. Since the data B is data in the second term of the first row, the second term of the fourth row, and the first term of the fifth row, position data corresponding to the data B are expressed by (1,2), (4,2), and (5,1). Since the data C is data in the first term of the second row, position data corresponding to the data C is expressed by (2,1). The data D is data in the second term of the third row and the first term of the fourth row, and position data corresponding to the data D is expressed by (3,2) and (4,1). The data E is data in the second term of the fifth row, and position data corresponding to the data E is expressed by (5,2).

Note that the labels "A" to "E" are used to discriminate the data A to E in FIG. 3, similar to FIG. 2, but the present invention is not limited to this. IDs for discriminating and identifying data suffice to be exclusive, and IDs different from the labels "A" to "E" may be designated. For example, IDs "あ" to "お" may be used for the data A to E to store the position data.

This is aimed at processing data each having same data and different title in the binomial relation data as same data in the position data by the IDs. In the above example, data each having same data and different title don't exist.

The first partial tree generation unit 30 searches for chains between a plurality of binomial relation data stored in the binomial relation data storage unit 10, and outputs a search result as tree structure data (partial tree).

The partial tree integration unit 40 integrates partial trees generated by the first partial tree generation unit 30 on the basis of binomial relation data stored in the binomial relation data storage unit 10, and generates and outputs one tree structure as flow data.

The outline of processing operation of the flow data generation apparatus in FIG. 1 will be explained with reference to the flow chart shown in FIG. 5.

First, the partial tree integration unit 40 determines one or more start point candidate of flow data on the basis of binomial relation data stored in the binomial relation data storage unit 10 (step S101). The number of start point candidates may be one or more. Binomial relation data having start point candidates are specified as the first term among binomial relation data in the binomial relation data storage unit 10 (step S102). Partial trees whose roots are the second terms are generated in which the start point candidate is the first term of the binomial relation data.

Each start point candidate and each partial tree generated in which the second term data of the binomial relation data is the root and the start point candidate is the first term data of the binomial relation data are linked (integrated), and data tree whose root is the start point candidate is newly generated (step S104).

If only one start point candidate exists, the data tree is directly output as flow data. If a plurality of start point candidates exist, one of them is selected as the start point of flow data. And, for example, the start point is linked to a data tree whose root is another one of the start point candidates, thereby a plurality of data trees are integrated into one data tree. In this way, flow data obtained by integrating partial trees generated by the first partial tree generation unit 30 into one is generated (step S105).

Processing operations of each section of FIG. 1 will be explained in detail.

Figure 6:
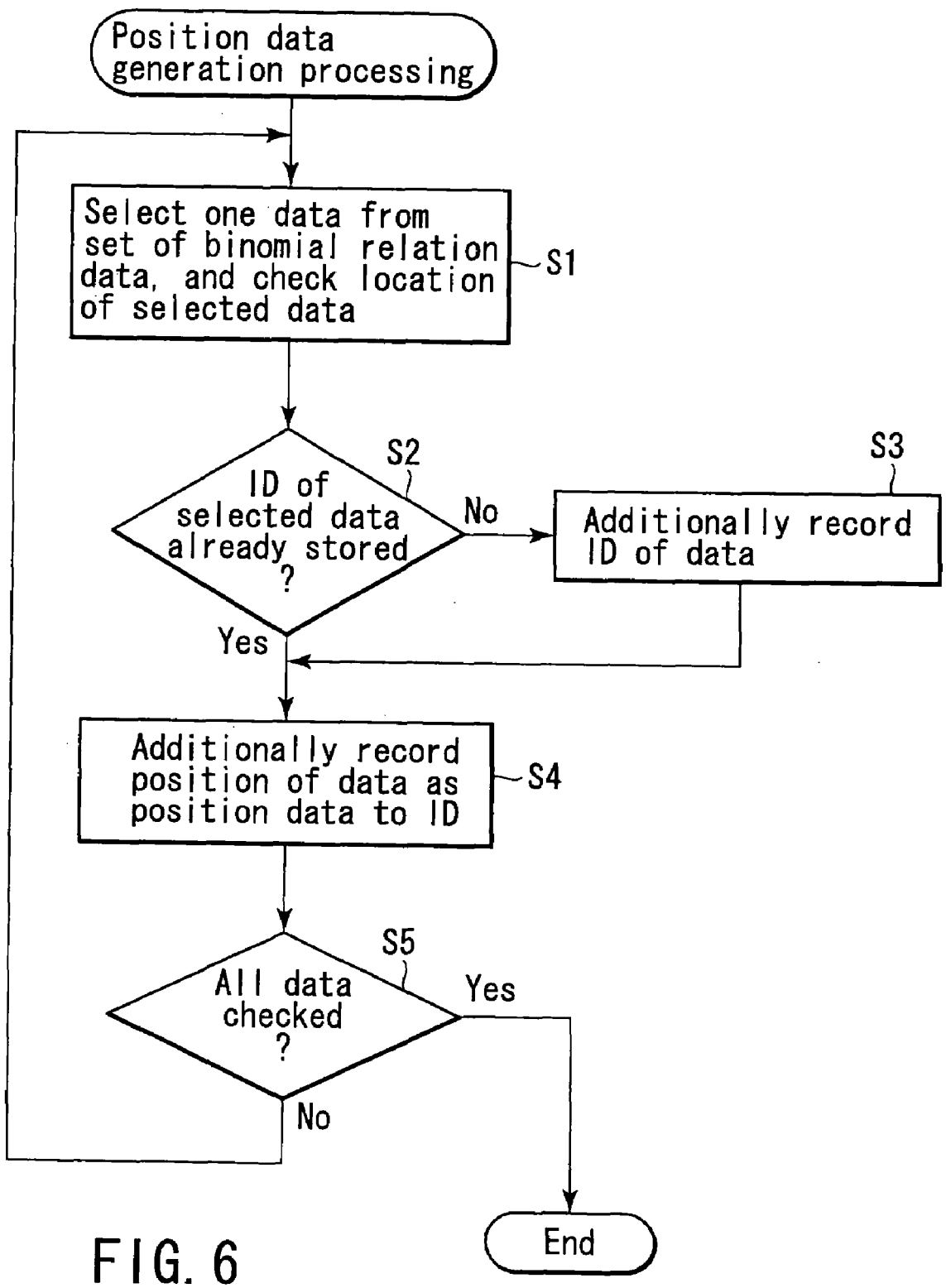
FIG. 6 is a flow chart showing processing operation of the position data generation/storage unit according to the first embodiment.

The position data generation sequence of the position data generation/storage unit 20 will be described with reference to the flow chart of FIG. 6 in which a sequence of converting a plurality of binomial relation data shown in FIG. 2 into position data shown in FIG. 3.

One arbitrary data from the binomial data set (only the first and second term data) is selected, and the position of the data is checked (step S1). If the data selected in step S1 has already existed as an ID (step S2), the position of the binomial relation data is added (step S4). If the ID has not existed, the ID is added (step S3).

By the position data generation processing sequence, for example, (2,1) is recorded as position data of the data C in the first term of binomial relation data in the second row of FIG. 2, and (2,2) is recorded as position data of the data A of the second term.

Partial tree generation processing of the first partial tree generation unit 30 will be described with reference to the flow chart shown in FIG. 7.

The second term of predetermined binomial relation data serves as a parent node candidate (step S11). If parent node candidates exist, one of the parent nodes is selected (steps S12 and S13), and advances to step S14. If no parent node candidate exists, the processing ends.

In step S14, position data corresponding to the ID of the parent node candidate is searched from a position data table (e.g., FIG. 3), that is, position data (row) in binomial relation data is searched in which the parent node candidate serves as the first term of the binomial relation data. If position data serving as the first term is searched, the processing advances to step S16. If no corresponding data is searched, search concerning this parent node candidate ends (step S15), and the processing returns to step S12.

In step S16, in the binomial relation data table (see FIG. 2), data in a first column of the position data (row) searched in step S14 serves as a parent node, data in a second column of the position data (row) searched in step S14 serves as a child node, and a binomial relation type in the third column of the binomial relation data table is added to an arc. The child node set in step S16 is defined as a new parent node candidate (step S17), and returns to step S12.

A case in which data of the second row in FIG. 2 is given as a predetermined binomial relation (from the partial tree integration unit 40 (which is described later)) will be considered. In this case, the second term data, i.e., "A" in binomial relation data of the second row serves as a root, and chained (associated) data are searched sequentially. Data which are stored in the position data generation/storage unit 20 and have "A" as the first term are expressed by (1,1) and (3,1) as shown in the position data in FIG. 3 ((2,2) is excluded because the data A is the second term). Therefore, data chained to the root "A" are data of (1,2) and (3,2), that is, as shown in FIG. 3, the data "B" and "D". These chain relations are symbolized together with binomial relation types:

A—Yes→B  (x1)

A—No→D  (x2)

Subsequent to the chains from the root "A", chained data is searched, similar to the above data "A". By referring to position data in FIG. 3, it is understood that binomial relation data having "B" as the first term data exists in the fifth row of the binomial relation data table of FIG. 2. The ID "E" of the fifth row don't exist in the first term data, an end point of the chain from the data "B" is the data "E". And data "D" is chained to the data "B" in the fourth row of the binomial relation data table of FIG. 2. As described above, the data "B" is chained to the data "E", so the chain from the data "D" is also terminated at the data "E" (next expressions (x1) to (x5) are referred).

B—Next→E  (x3)

D—Next→B  (x4)

B—Next→E  (x5)

Figure 8:
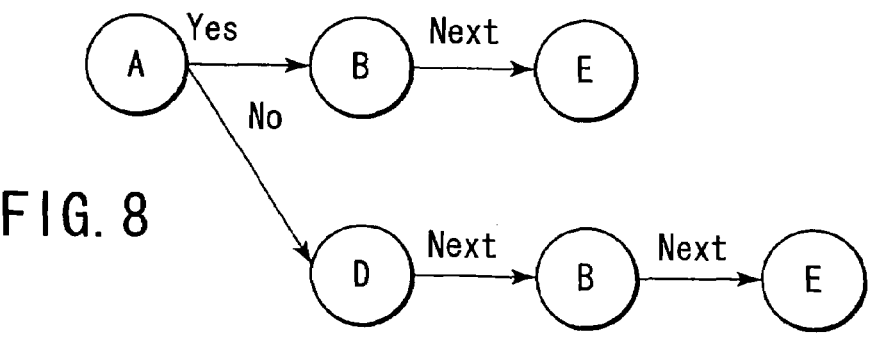
FIG. 8 is a view showing an example of a partial tree generated by the first partial tree generation unit according to the first embodiment.

Therefore, a tree structure rooted at the data "A" is generated by integrating the above expressions (x1) to (x5) as shown in FIG. 8. The first partial tree generation unit 30 does not perform node sharing processing (processing of combining data having the same ID into one node) for a graph. The first partial tree generation unit 30 generates a "tree" structure.

Figure 9:
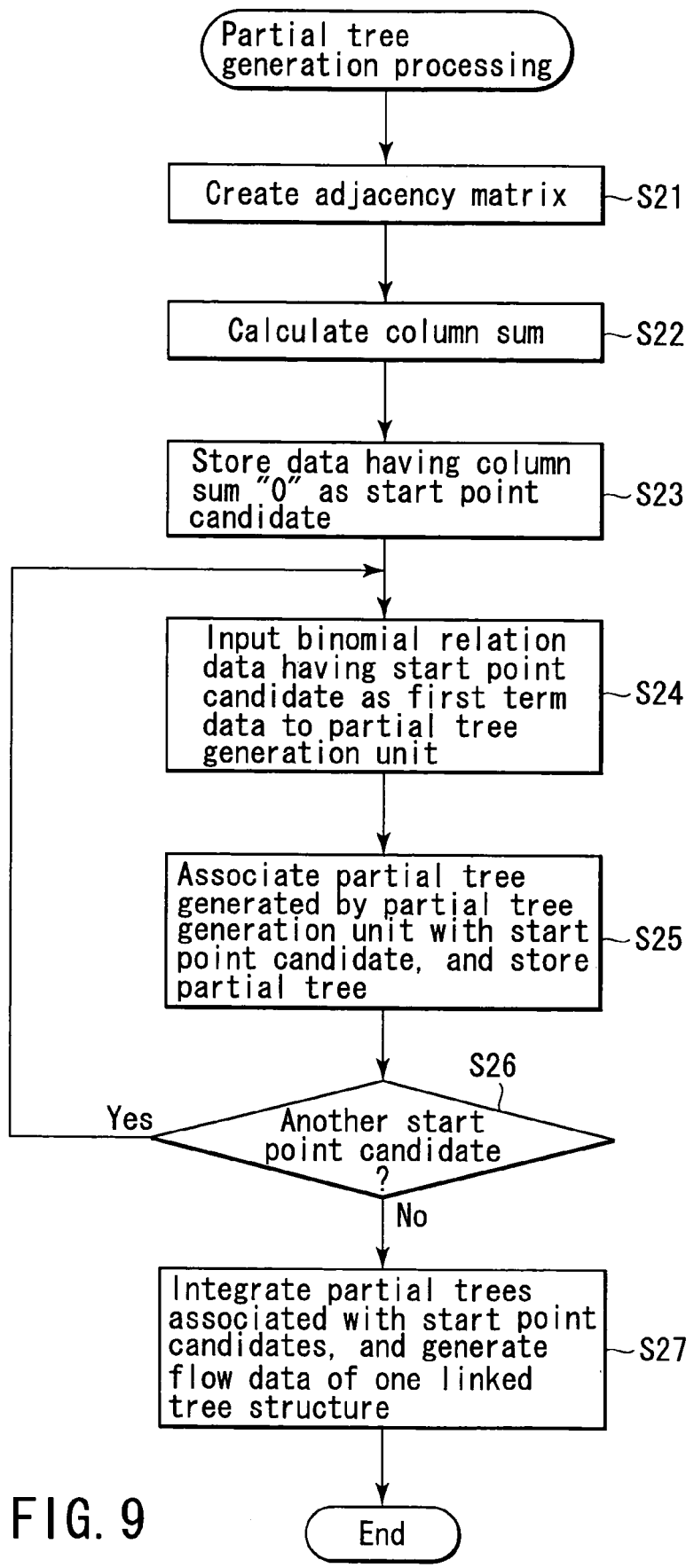
FIG. 9 is a flow chart showing processing operation of a partial tree integration unit according to the first embodiment.

Partial tree integration processing in the partial tree integration unit 40 will be explained with reference to the flow chart shown in FIG. 9.

An adjacency matrix is generated (step S21 and S22). Data in a column having a column sum "0" is stored as a start point candidate (step S23).

Binomial relation data having a start point candidate as the first term is searched from the position data table, and input to a partial tree generation unit (e.g., the first partial tree generation unit 30) (step S24), thereby a partial tree rooted at the second term data of the acquired binomial relation data is obtained. The start point candidate is associated with each partial tree root (second term data of the binomial relation data), and a data tree rooted at the start point candidate is generated and stored (step S25).

If another start point candidate remains (step S26), the processing returns to step S24; if NO (step S26), advances to step S27.

In step S27, partial trees (data trees rooted at each start point candidate) associated with start point candidates are integrated (if only one start point candidate exists, partial trees need not be integrated). Accordingly, tree structure data (flow data) obtained by linking (integrating) data trees is generated.

An adjacency matrix in FIG. 10 is generated in order to determine the start point (start point candidate) of flow data. The adjacency matrix is a matrix in which the IDS shown in FIG. 3 are arranged in the rows and columns. In each column ID, data "1" are input in the IDs of each row whose IDs are the parent nodes, and data "0" are input in the other IDs of each row (This is the same as the case in which, in each column, data "1" are input in the IDs of each column whose IDs are the child nodes, and data "0" are input in the other IDs of each column). Column sums are obtained for each column.

The ID of a column having a column sum "0" serves as a start point candidate. In FIG. 10, only the column sum of the column "C" is "0". Binomial relation data are searched from the position data table of FIG. 3, and binomial relation data in the second row of FIG. 2 is given as binomial relation data which provides a partial tree root to the first partial tree generation unit 30 corresponding to the data positioned at (2,1) of the binomial relation data. Then, the partial tree is generated as shown in FIG. 8. The obtained partial tree and the start point candidate "C" is integrated based on a relation as shown in the following expression (x6) which indicates the binomial relation data of the second row in FIG. 2, thereby new tree structure data as shown in FIG. 11, that is, a data tree is obtained.

$$C\text{—Next}\rightarrow A \tag{x6}$$

When a plurality of start point candidates exist, binomial relation data are input to the first partial tree generation unit 30 sequentially to obtain a partial tree, and a new data tree containing the binomial relation data of the start point candidate is generated.

The presence of a plurality of start point candidates (e.g., "F" and "G" exist in addition to "C") results in a so-called non-linked graph. For 5 descriptive convenience, in the apparatus, these data trees is associated in which second and subsequent start point candidates serves as child nodes of the first start point candidate. A predetermined binomial relation type such as "Other" is added to branches (arcs) which associate the first start point data (e.g. data "C") with each of the second and subsequent point data (data "F" and "G") (As shown in FIG. 12, for example, new IDs "F" and "G" serves as start point candidates). If no start point candidate exists, the start point is determined by a predetermined procedure.

Assume that data serving as the start point of flow data is data representing a condition for branching to either "Yes" or "No". For descriptive convenience, "No" is desirably added as a binomial relation type to an arc from data serving as the start point of flow data to another start point candidate.

Processing of the partial tree integration unit 40 will be described in more detail with reference to the flow chart shown in FIG. 9. In this description, five binomial relation data shown in FIG. 2 will be exemplified.

In order to determine the start point of flow data, a so-called adjacency matrix shown in FIG. 10 is created (step S21). The adjacency matrix is created by arranging the IDs "A" to "E" of the five data A to E shown in FIG. 3 in rows and columns, thereby the IDs serves as row elements and column elements of each of elements (matrix elements) in the matrix. The value of each matrix element represents the link between the first and second term data of each binomial relation data and the link direction. The link indicates the relation between parent and child nodes described above, but does not contain the relation type of binomial relation data. For example, a matrix element having a value "1" represents the presence of binomial relation data having row component data as the first term and column component data as the second term. This also means that the matrix element having the value "1" represents the link between row component data serving as a parent node and column component data serving as a child node, and the link direction. A matrix element having a value "0" represents the absence of binomial relation data having row component data as the first term and column component data as the second term. This also means that the matrix element having the value "0" represents the absence of any link between row component data serving as a parent node and column component data serving as a child node.

After the adjacency matrix is generated, the sum of the matrix element values of each column is calculated as a column sum (step S22). Assuming that data corresponding to a column whose column sum is "0" is a child node, no parent node is connected to the data itself as a child node (this means that the binomial relation data having this data as the second term does not exist, in other words, the data appears in only the first term out of the first and second terms of a plurality of supplied binomial relation data. Hence, data corresponding to a column (corresponding to a column component) whose column sum is "0" (step S23) serves as a start point candidate.

In the adjacency matrix shown in FIG. 10, only the column sum of the column having the ID "C" is "0". In this case, only the data C is stored as a start point candidate. If a plurality of columns having the column sum "0" exist, the same number of start point candidates exist.

If data having the column sum "0" does not exist, a start point candidate is determined in accordance with a predetermined rule (for example, the first term of the first binomial relation data serves as a start point candidate).

At step S23, binomial relation data having the data C is obtained as the first term. In this case, position data is searched in FIG. 3 and the binomial relation data whose first term serves data "C" is obtained. That is, the position data of the data "C" is (2,1), the binomial relation data including data corresponding to the position data (2,1) exists in the second row in a table which records binomial relation data as shown in FIG. 2. Then, the binomial relation data in the second row is output to the first partial tree generation unit 30 (step S24).

Figure 7:
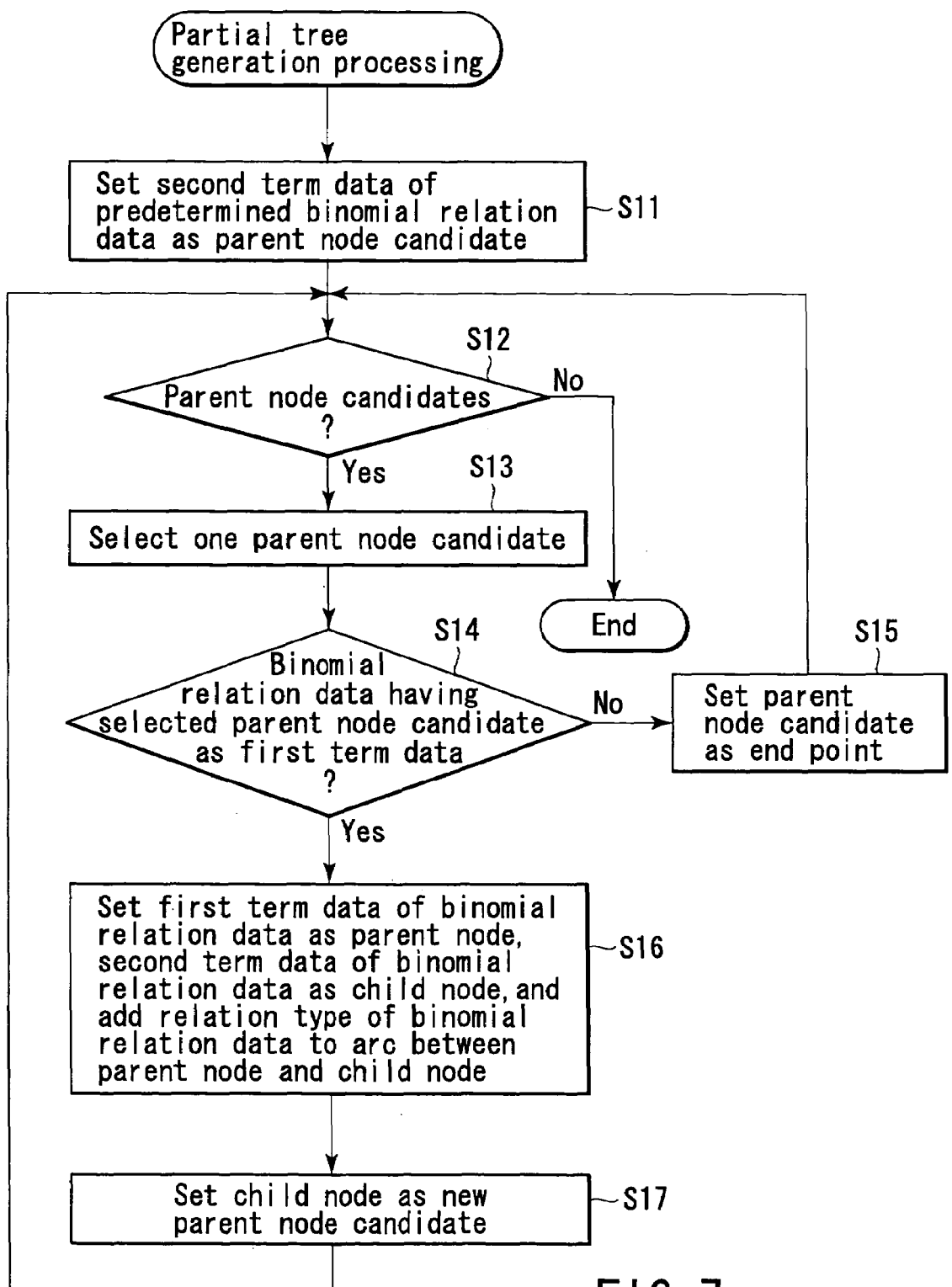
FIG. 7 is a flow chart showing processing operation of the first partial tree generation unit according to the first embodiment.

The first partial tree generation unit 30 which has received the binomial relation data in the second row targets the binomial relation data, and performs partial tree generation processing shown in FIG. 7. A partial tree shown in FIG. 8 that is rooted at the data A in the second term of the binomial relation data in the second row is generated. As the partial tree is generated, the partial tree is output to the partial tree integration unit 40.

The root of the generated partial tree is associated with the first term data (start point candidate "C") of the binomial relation data in the second row. The binomial relation type of the binomial relation data is added to the arc, and a data tree shown in FIG. 10 is generated (step S25).

If a plurality of start point candidates are obtained in step S23, steps S24 and S25 are repeated for all the start point candidates (step S26). Consequently, data trees corresponding to all the start point candidates are attained.

The partial tree integration unit 40 integrates data trees generated in correspondence with respective start point candidates into data flow of one linked tree structure (step S27).

For example, assume that only the data C is obtained as a start point candidate in step S23. In this case, binomial relation data having the data C as the first term (binomial relation data in the second row of FIG. 2) is obtained in step S24.

The chain between the data C and the data A of the binomial relation data in the second row can be given by the following expression (6). Letting the data C be a parent node, the data A is connected as a child node, and the relation type "Next" between the data A and the data C is added to an arc from the data C to the data A.

$$C \xrightarrow{Next} A \quad (6)$$

In step S25, the chain given in expression (6) is integrated with the partial tree rooted at the data A (that is, the data C is connected to the head of the data A serving as the root node of the partial tree in FIG. 8). "Next" is added to the arc from the data C to the data A, thus generating a data tree shown in FIG. 11. If only one start point candidate exists, the data tree shown in FIG. 11 is directly output as flow data from the partial tree integration unit 40.

In data structure search, a depth-first search algorithm or the like is well known. For example, the depth-first search algorithm adopts a recursive algorithm, and searches for each node only once. Thus, data structure search starting from the binomial relation data in the second row of FIG. 2 results in C→A→B→E→D.

This search algorithm is based on a chain relation matrix called an adjacency matrix which is created from a node and arc data. Of data structure generation methods (1) to (3) based on node data that have been introduced as conventional techniques, methods (1) and (2) do not describe any relation type between nodes. These methods do not describe a link type (Yes, No, Other, or the like) in the node profile. The relation between nodes is represented by one type of adjacency matrix such as the score sheet of a round robin game. To introduce a plurality of link types to links (arcs) between nodes, a plurality of adjacency matrices must be substantially processed. Methods (1) and (2) as conventional techniques correspond to a technique which processes only one adjacency matrix. Method (3) described as a conventional technique substantially processes a plurality of adjacency matrices. In method (3), however, input data are combined in advance into each node which assumes a data structure.

The first embodiment processes data of each node not as input data but as binomial relation data. Therefore, an operator need not perform input work of arranging nodes in advance, which should be done in his head. Note that only one type of adjacency matrix in FIG. 10 exists. This adjacency matrix represents the OR condition of the adjacency matrix for each arc type in order to determine a start point node, and is not utilized to create a data structure itself.

As described above, in the first embodiment, in generating a partial tree rooted at the second term of binomial relation data having start point candidate data of flow data as the first term and when each node of the partial tree is set as a parent node candidate in generating a partial tree, (a) processing target data corresponding to the second term of the binomial relation data in which data identical to a parent node candidate serving as a child node is connected to data identical to the first term data of the binomial relation data as a parent node, (b) the type of correspondence in which processing target data corresponding to the parent node serves as the first term and the processing target data corresponding to the child node serves as the second term data is added to an arc which connects the parent and child nodes, generating a partial tree. When only one start point candidate exists, the data tree is directly output as flow data. When a plurality of start point candidates exist, a plurality of data trees are generated. In this case, one of the start point candidates is selected as the start point of flow data, and this start point is connected to a plurality of data trees. Predetermined correspondence types are added to arcs which connect the start point candidates, generating flow data.

Second Embodiment

The first embodiment is a method of sequentially tracking chain relations directly and permits data of the same content to repetitively appear in the data structure of flow data. This is because the purpose of this method is to express the logical flow of chain relations along the thought of the creator. To the contrary, the second embodiment arranges and summarizes data into each data content (i.e., each node), and generates the data structure of flow data. In this case, data are summarized for each work unit executed by the user in accordance with flow data information.

Figure 13:
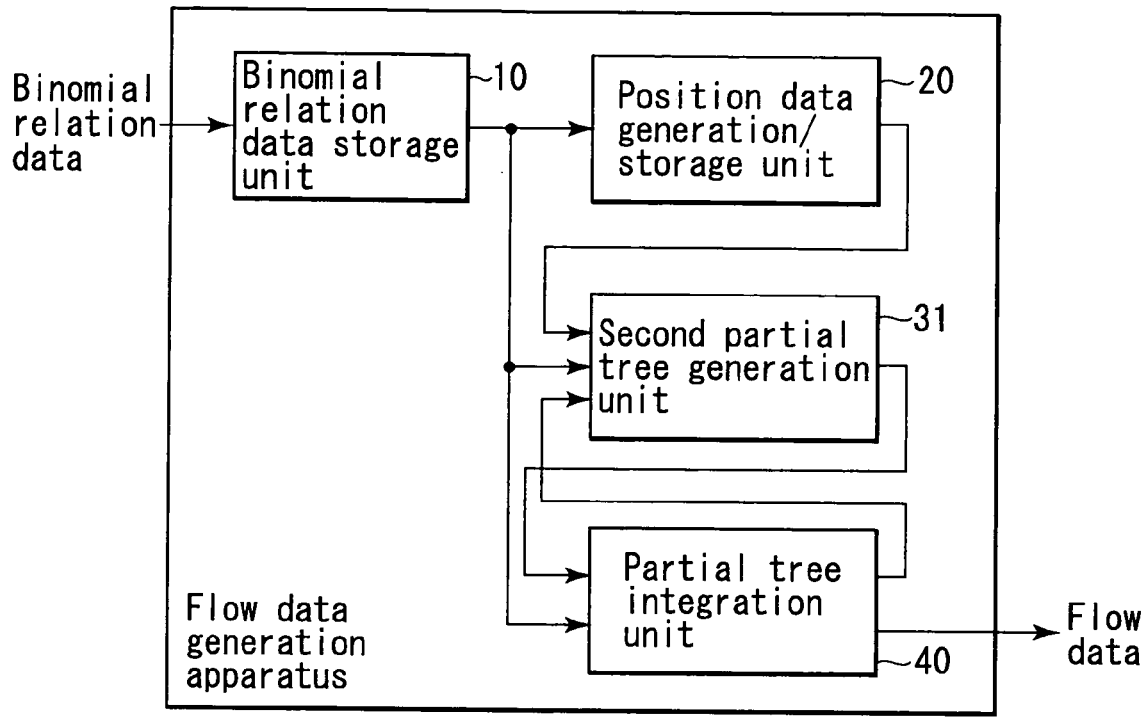
FIG. 13 is a block diagram showing a configuration example of a flow data generation apparatus according to the second embodiment of the present invention.

FIG. 13 shows a configuration example of a flow data generation apparatus according to the second embodiment. In FIG. 13, the same reference numerals as in FIG. 1 denote the same parts, and only a different part will be described. That is, in FIG. 13, a second partial tree generation unit 31 replaces the first partial tree generation unit 30 of FIG. 1.

Figure 14:
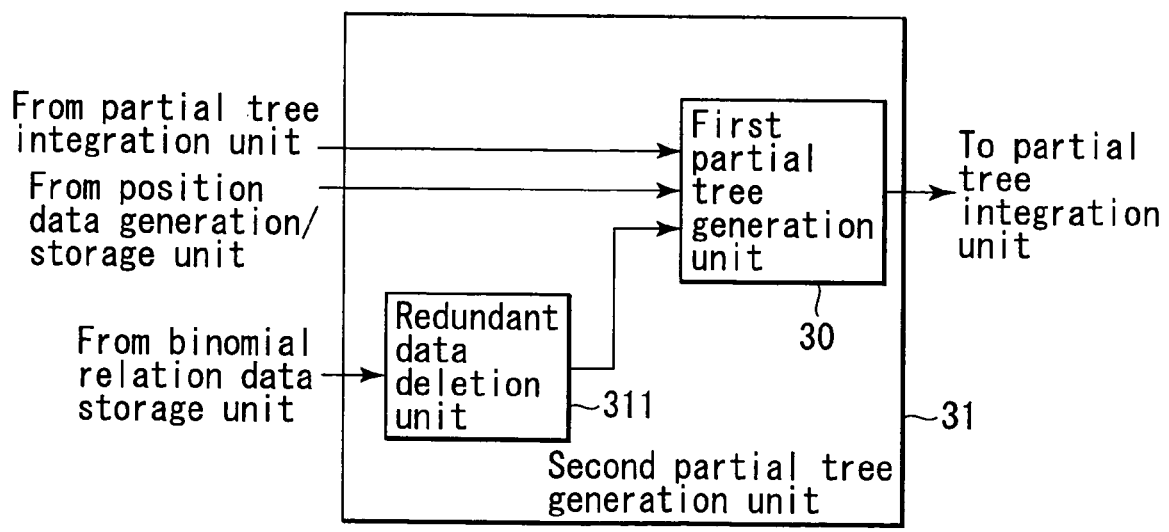
FIG. 14 is a block diagram showing a configuration example of the second partial tree generation unit according to the second embodiment.

FIG. 14 shows a detailed configuration example of the second partial tree generation unit 31. The second partial tree generation unit 31 comprises a first partial tree generation unit 30 described in the first embodiment, and a redundant data deletion unit 311. Since the redundant data deletion unit 311 is adopted, binomial relation data (redundant data) which has been searched can be excluded from search targets when the first partial tree generation unit 30 searches for binomial relation data in which a parent node is the first term data of the binomial relation data.

When the first partial tree generation unit 30 searches once for binomial relation data in which a parent node to be searched is identical to the first term, the redundant data deletion unit 311 deletes the searched binomial relation data from the next search targets.

Figure 15:
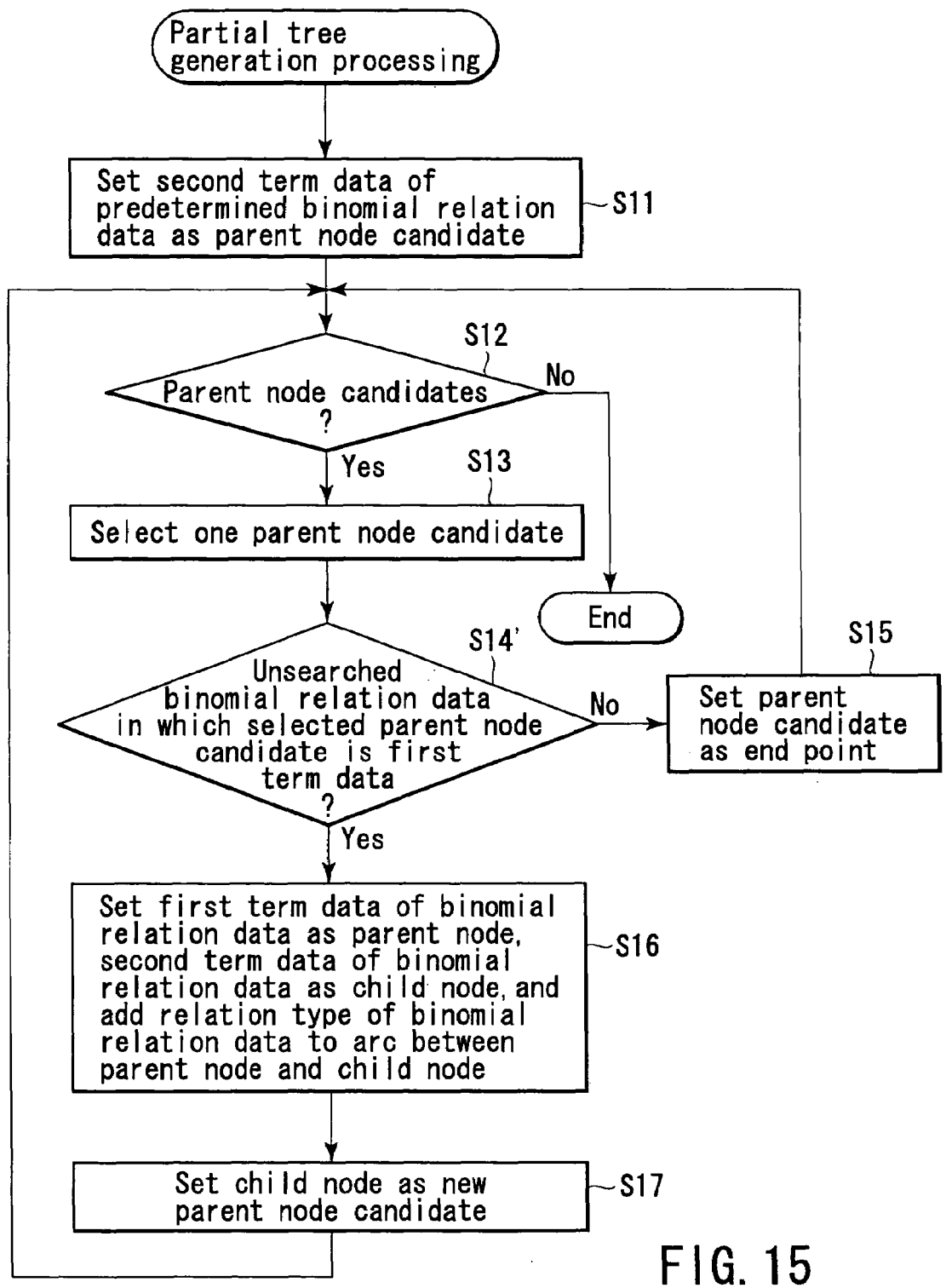
FIG. 15 is a flow chart for explaining processing operation of the second partial tree generation unit according to the second embodiment.

Processing operation of the second partial tree generation unit 31 will be explained with reference to the flow chart shown in FIG. 15. In FIG. 15, the same reference numerals as in FIG. 7 denote the same parts. The flow charts of FIGS. 7 and 15 are different in that step S14' in FIG. 15 replaces step S14 in FIG. 7. That is, in step S14', binomial relation data (non-redundant data) which have not been searched yet are obtained out of binomial relation data in which a parent node candidate selected in step S13 serves as the first term data.

The first terms of predetermined binomial relation data serves as a parent node candidate (step S11). One of the parent node candidates is selected (steps S12 and S13), and advances to step S141. If no parent node candidate exists (NO in step S12), the processing ends.

In step S14', position data corresponding to the ID of the parent node candidate is searched from a position data table (e.g., FIG. 3), and position data (row) in binomial relation data which has not been searched yet (unsearched) which has the first term serving as the parent node candidate is searched. If the data is found, the process advances to step S16. If no data is found, search concerning the parent node candidate ends (step S15), and the processing returns to step S12.

In step S16, the first column of the binomial relation data corresponding to the position data (row) searched in step S14 is set as a parent node, the second column of the binomial relation data corresponding to the position data (row) searched in step S14 is set as a child node in the binomial relation data table (see FIG. 2), and a binomial relation type represented in the third column of the binomial relation data table is added to an arc. Then, the child node set in step S16 is defined as a new parent node candidate (step S17), and returns to step S12.

Assume that, for example, data in the second row of FIG. 2 is supplied as binomial relation data as well as the first partial tree generation unit 30. The second term data, i.e., "A" in the binomial relation data of the second row is used as a root, and chained (associated) data are sequentially searched. Similar to the first embodiment, data chained to "A" are given by the expressions (x1) and (x2).

The second partial tree generation unit 31 detects whether binomial relation data given by relations (x1a) and (x2a) are redundant data. If so, the second partial tree generation unit 31 does not output the data as binomial relation data. If no binomial relation data exists, the second partial tree generation unit 31 additionally stores these data for redundancy detection, and outputs the data as binomial relation data to the redundant data deletion unit 311. In this case, all "A", "B", and "D" are input for the first time, and no same data which have been stored exist, so these three data are directly stored and output. For descriptive convenience, expression. (x1a) and (x2a) are newly shown as follows.

A—Yes→B (x1a)

A—No→D (x2a)

Subsequent to the chain from the root "A" similar to the first partial tree generation unit 30, searching for data chained to "B" and "D" similarly to "A" follows after the chain from root "A". However, this search is given by relations (x3) to (x5) similar to the first embodiment, the redundant data deletion unit 311 detects that data appearing in relation (x5) is identical to data which is given by relation (x3) and has been stored. For descriptive convenience, the expressions (x3) and (x4) are also shown as expressions (x3a) and (x4a).

B—Next→E (x3a)

D—Next→B (x4a)

Therefore, a tree structure (a partial tree) rooted at the data "A" is shown in FIG. 16 obtained by integrating relations (x1a) to (x4a). The second partial tree generation unit 31 does not perform node sharing processing (processing of combining a plurality of nodes having the same ID into one node) for a graph, and generates a "tree" structure.

In step S14', binomial relation data supplied from the partial tree integration unit 40 in step S11 or binomial relation data which has been searched in step S14 may be excluded from search targets in advance. In step S14', for example, binomial relation data in which data corresponding to a parent node candidate serves as the first term may be searched from all binomial relation data shown in FIG. 2, and thereafter, the redundant data deletion unit 311 may check whether the searched binomial relation data is redundant data such as binomial relation data given by the partial tree integration unit 40 in step S11 or binomial relation data which has been searched in step S141. If the searched binomial relation data is redundant data, the redundant data deletion unit 311 does not output the binomial relation data to the first partial tree generation unit 30 to prevent the searched binomial relation data from undergoing processes in step S14' and subsequent steps in the first partial tree generation unit 30. If the searched binomial relation data is not redundant data, the redundant data deletion unit 311 stores the searched binomial relation data in order to use it for detection of the next redundant data, and outputs the searched binomial relation data to the first partial tree generation unit 30 to be subjected to processes in step S14' and subsequent steps in the first partial tree generation unit 30.

Processing operation of the second partial tree generation unit 31 will be described by exemplifying a concrete example along processing operation of the second example. Similar to the first embodiment, for example, assume that binomial relation data in the second row of FIG. 2 is supplied from the partial tree integration unit 40 to the second partial tree generation unit 31. The second term data, i.e., data A of the binomial relation data in the second row serves as a root, and sequentially chained data are searched. Data chained to the data A are data B and data D, as given by relations (1) and (2), similar to the first embodiment. Binomial relation types "Yes" and "No" are added as binomial relation types to the arc.

The second partial tree generation unit 31 determines whether the binomial relation data given by relations (1) and (2) are redundant data which have been searched. If so, the binomial relation data are not output as search targets to the first partial tree generation unit 30. If these data are unsearched binomial relation data which have not been searched, the redundant data deletion unit 311 additionally stores them for detection of the next redundant data, and outputs them as binomial relation data to the first partial tree generation unit 30. In this case, all the data A, B, and D as shown in relations (1) and (2) contained in the binomial relation data are input for the first time. Therefore, the three data A, B, and D are stored in the redundant data deletion unit 311 for detection of the next redundant data, and output to the first-partial tree generation unit 30. For descriptive convenience, the binomial relation data as shown in relations (1) and (2) are newly given by the expressions (1a) and (2a).

A—Yes→B (1a)

A—No→D (2a)

Subsequent to the chain from the root "A", data chained to the data B and data D are searched. As a result, similar to the first embodiment, binomial relation data as given by relations (3) to (5) are searched. However, The binomial relation data given by relation (5) is detected by the redundant data deletion unit 311 as binomial relation data (identical to data of relation (3) which has been searched (which has been stored as redundant data). Thus, the binomial relation data given by (5) is not output to the first partial tree generation unit 30 for processes in step S14 and subsequent steps (deleted from search results by the redundant data deletion unit 311). That is, binomial relation data corresponding to the relations (3) and (4) are obtained as a search result in step S14.

For descriptive convenience, the above expressions (3) and (4) are newly shown in expressions (3a) and (4a) as follows.

B—Next→E (3a)

D—Next→B (4a)

Thus, the second partial tree generation unit 31 generates a tree structure (partial tree) which is obtained by integrating relations (1a) to (4a) and rooted at the data A, as shown in FIG. 16.

The second partial tree generation unit 31 generates a "tree" structure without performing node sharing processing for a graph (processing of integrating same position data into a node).

As the partial tree in FIG. 16 is generated in the second partial tree generation unit 31, the partial tree integration unit 40 generates flow data as shown in FIG. 17 starting from one start point candidate (e.g. data "C") by partial tree integration processing.

As described above, the second embodiment can easily generate a work flow serving as a data flow which puts importance on work contents, on the basis of binomial relation data identical to that used to generate a flow chart.

Third Embodiment

The flow data generation apparatus in the first and second embodiments can be also applicable to data to be processing target having a hierarchical structure such as object-oriented data. The third embodiment concerns an application to data having the hierarchical structure such as object-oriented data. Especially in the embodiment, a case wherein the flow data generation apparatus described in the first embodiment processes data having a hierarchical structure will be explained.

In this embodiment, one of a plurality of data having a hierarchical structure represents a first term data, and another data of the data represents a second term data. One binomial relation data is comprised of the first term data, second term data, and a correspondence type representing a correspondence from the first term data to the second term data.

FIG. 18 shows an example of a plurality of binomial relation data in which data having a hierarchical structure are the first and second terms.

Each data to be the processing target is comprised of three layers. The uppermost layer is represented by "I" or "II". The subsequent layer (the second layer) is represented by "α", "β", or "γ". The lowermost layer (the third layer) is represented by "A", "B", "C", "D", or "E". In other words, data of the first and second layers represent classes (attributes) to which the data A to E. However the example shows the belonging relation (inclusion relation of the three layers, the number of layers is generally arbitrary on the assumption that classes have an inclusion relation.

In general, data hierarchization makes the number of classes of an upper layer smaller than that of classes of a lower layer. A hierarchical structure is therefore suitable for comprehensively understanding data from the macroscopic view.

The third layer in the second term of the first row in FIG. 18 is blank. This does not mean "no data" but means that the second term data is "II·β·". The feature of hierarchical data does not permit data having no upper layer (e.g., data "II··β") because of the characteristic of the hierarchical data structure.

FIG. 19 shows a configuration example of the flow data generation apparatus according to the third embodiment. In FIG. 19, the same reference numerals as in FIG. 1 denote the same parts, and only a different part will be described. That is, in FIG. 19, a third partial tree generation unit 32 replaces the first partial tree generation unit 30 of FIG. 1.

FIG. 20 shows a configuration example of the third partial tree generation unit 32. The third partial tree generation unit 32 comprises a first partial tree generation unit 30 described in the first embodiment and a position data attribute determination unit 312. The attribute determination unit 312 will be described later.

Similar to the first embodiment, a position data generation/storage unit 20 converts a plurality of binomial relation data shown in FIG. 18 into position data. Strictly, data input to the position data generation/storage unit 20 is different from input data assumed in the position data generation/storage unit 20 of the first embodiment in that class attribute data is added. However, processing operation of the position data generation/storage unit 20 is the same as processing of the flow chart shown in FIG. 6.

That is, an ID serves as an identifier for identifying each data. Position data represents the appearance position of the ID in the table of FIG. 18 in the coordinate format.

FIG. 21 shows an example of a position data table in which generated position data from the binomial relation data shown in FIG. 18 is stored as the table in the position data generation/storage unit 20.

For example, data corresponding to an ID "I·α·A" (to be also simply referred to as data "I·α·A" by using the ID as the sign of the data) appears in the first term of the first row, the second term of the second row, and the third term of the third row in the table shown in FIG. 18. Hence, position data of the data "I·α·A" are (1,1), (2,2), and (3,1), as shown in FIG. 21.

Next, the attribute determination unit 312 will be explained. The attribute determination unit 312 discriminates the attribute relation between two data corresponding two arbitrary position data stored in the position data generation/storage unit 10. For example, when the first term data "I·α·A" and second term data "II·β·" in the first row of FIG. 18 are supplied, it is found that these two data are not identical to each other and do not have any inclusion relation (A and β do not have any inclusion relation).

The attribute determination unit 312 determines whether "the first data is identical to the second data or includes the second data" for, e.g., the first and second data in accordance with the order of the two received data.

For example, it is determined that the first term data (first data) and second term data (second data) in the first row of FIG. 18 "are not the same and do not have any inclusion relation", that is, "non-approved". When data "II·β" and data "II·β·B" are input as the first and second data to the attribute determination unit 312, these two data belong to the same class "II·β". Thus, the attribute determination unit 312 determines that these data "are identical to each other or have the inclusion relation", i.e., "approved".

As the determination result of the attribute determination unit 312, "NULL" meaning the absence of data may be output instead of "non-approved". Also, two determined data may be directly output as a determination result instead of "approved". For example, when two determined data are "II·β" and data "II·β·B", the determination result is "approved", i.e., "II·β, II·β·B".

Figure 22:
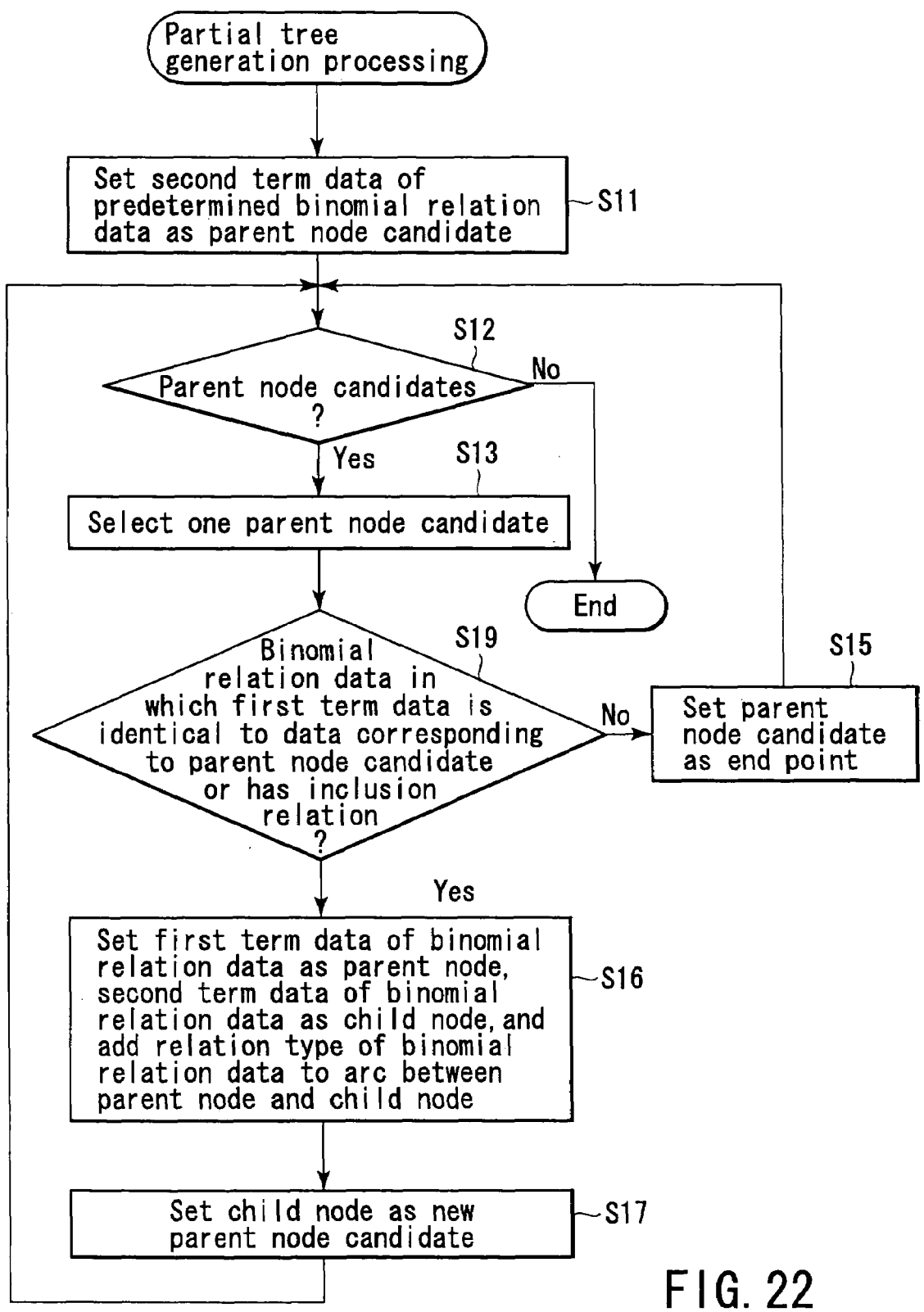
FIG. 22 is a flow chart for explaining processing operation of the third partial tree generation unit according to the third embodiment.

Processing operation of the third partial tree generation unit 32 will be explained with reference to the flow chart shown in FIG. 22. In FIG. 22, the same reference numerals as in FIG. 7 denote the same parts, and only a different part will be described. In FIG. 22, step S19 replaces step S14 in FIG. 7. In FIG. 7, if a parent node candidate is selected in step S12, binomial relation data in which data corresponding to the parent node candidate is the first term is not simply searched. To the contrary, binomial relation data in which data corresponding to the parent node candidate is identical to the first term data or has an inclusion relation is searched.

That is, the third partial tree generation unit 32 is different from the first partial tree generation unit 30 of the first embodiment in that first term data of binomial relation data in which the first term data has an inclusion relation with the second term data of supplied binomial relation data (data corresponding to the parent node candidate) is also searched in addition to the search in which another binomial relation data which has the first term data identical to the second term data of supplied binomial relation data.

In step S19 of FIG. 22, when data set as a parent node candidate is the first data and data in the first term of binomial relation data is the second data, the attribute determination unit 312 determines whether the second data is identical to the first data or has an inclusion relation.

Processing operation of the third partial tree generation unit 32 on the basis of the binomial relation data table shown in FIG. 18 and the position data table shown in FIG. 21 will be explained in detail. Assume that binomial relation data in the second row of FIG. 18 is supplied from a partial tree integration unit 40 to the third partial tree generation unit 32.

Chained data by using the second term data "I·α·A" of the binomial relation data in the second row as a root are sequentially searched. Position data corresponding to the data "I·α·A" designated as the first term data in the table shown in FIG. 18 that is stored in the position data generation/storage unit 20 are (1,1) and (3,1) in FIG. 21. Position data (2,2) represents that the data "I·α·A" is the second term data, and is excluded from chained-data search. Therefore, data chained to the data "I·α·A" are data (1,2) and (3,2), that is, from FIG. 21, these are "II·β·" and "II·β·D". Thus, these are expressed by binomial relation data as shown in the following expressions (10) and (11).

$$I·\alpha·A — Yes \rightarrow II·\beta· \quad (10)$$

$$I·\alpha·A — No \rightarrow II·\beta·D \quad (11)$$

Next, similar to the above data "I·α·A", chained data are searched in which data "II·β·" (node N2 in FIG. 23) and data "II·β·D" (node N8 in FIG. 23) connected as the child nodes of data "I·α·A" (node N1 in FIG. 23) serve as parent node candidate respectively.

Processing when the data "II·β·" (node N2 in FIG. 23) is set as a parent node candidate will be explained. The data "II·β·" includes data having "II·β·" as a class attribute. The attribute determination unit 312 sets the data "II·β·" as the first data, and detects data in which the second data is identical to the first data "II·β·" or data having an inclusion relation (data having "II·β·" as a class attribute) when each data of the first term of the binomial relation data is set as the second term data.

In FIG. 18, it is understood that the same data or data having an inclusion relation are binomial relation data in the fourth and fifth rows (in this case, data having an inclusion relation). The first term data "II·β·D" of the binomial relation data in the fourth row is connected as a child node of the data "II·β·" (node N3 in FIG. 23), and the first term data "II·β·B" of the binomial relation data in the fifth row is connected as a child node of the data "II·β·" (node N6 in FIG. 23).

Figure 23:
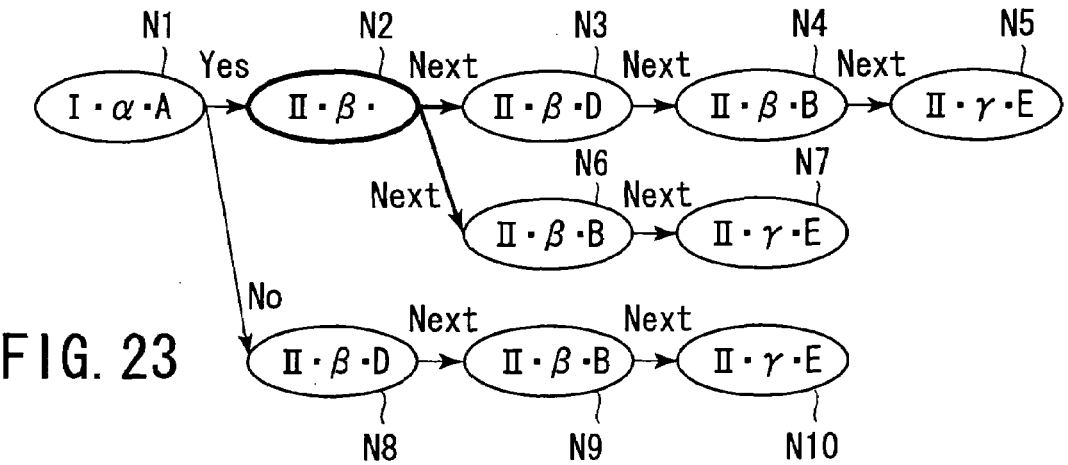
FIG. 23 is a view showing an example of a partial tree generated by the third partial tree generation unit according to the third embodiment.
Figure 24:
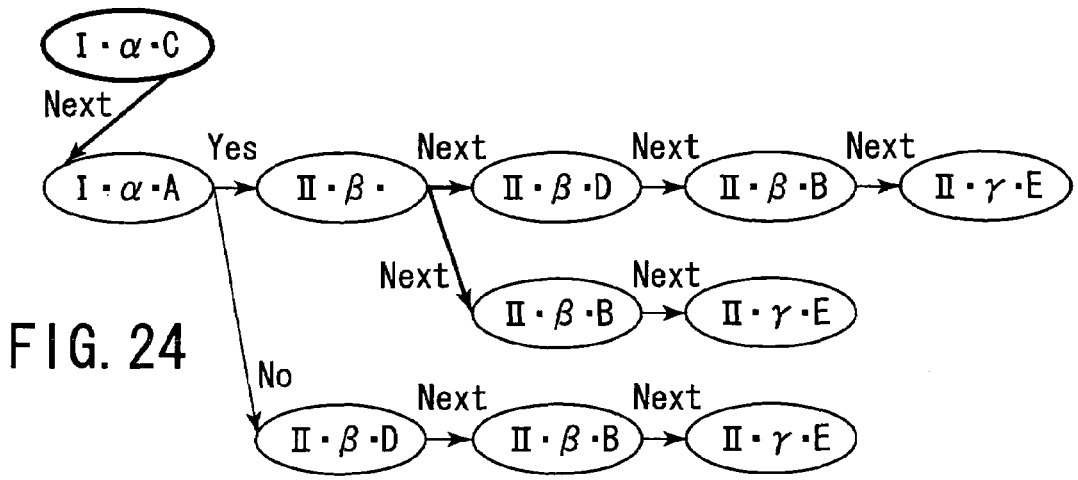
FIG. 24 is a view showing an example of flow data according to the third embodiment.

Based on the binomial relation data of the fourth row, the second term data "II·β·B" (node N4 in FIG. 23) is connected as the child node to the first term data of the binomial relation data "II·β·D" (node N3 in FIG. 23). Also, based on the binomial relation data of the fifth row, the second term data "II·γ·E" (node N7 in FIG. 23) is connected as the child node to the first term data of the binomial relation data "II·β·B" (node N6 in FIG. 23).

Next, when the second term data "II·β·B" of the binomial relation data in the fourth row is set as a parent node candidate, it is understood that binomial relation data which has the first term identical to the second term data or having an inclusion relation (in this case, the same data) exists in the fifth row as shown in FIG. 18. The second term data "II·γ·E" of the binomial relation data in the fifth row is connected as a child node of the data "II·β·B" (node N5 in FIG. 23). Next, when "II·γ·E" is set as a parent node candidate, no binomial relation data which has the first term data identical to the second term data or having an inclusion relation exist. Thus, the node N5 serves as an end point.

The node N7 also serves as an end point, similar to the above explanation.

Next, processing when data "II·β·D" is set as a parent node candidate (node N8 in FIG. 23) will be explained. When the data "II·β·D" is set as the first data and data in the first term of binomial relation data is set as the second data, the attribute determination unit 312 detects data identical to the data "II·β·D" or having an inclusion relation(in this case, the same data).

In this case, binomial relation data having data identical to the data "II·β·D" or with an inclusion relation (in this case, the same data) exists in the fourth row of FIG. 18. The second term data "II·β·B" of the binomial relation data in the fourth row is connected as a child node of the data "II·β·D" (node N9 in FIG. 23). Next, when the second term data "II·β·B" of the binomial relation data in the fourth row is set as a parent node candidate, it is understood that binomial relation data having data identical to the data "II·β·B" or with an inclusion relation (in this case, the same data) exists in the fifth row as shown in FIG. 18. The second term data "II·γ·E" of the binomial relation data in the fifth row is connected as a child node of the data "II·β·B" (node N10 in FIG. 23). The same search is done for the node N10 to find that the node N10 is an end point.

Although not described above, the relation type of binomial relation data having the parent node data as the first term and the child node as the second term is added to an arc which links parent and child nodes holds.

In this manner, the third partial tree generation unit 32 generates a partial tree shown in FIG. 23 rooted at the data "I·α·A".

Similar to the first partial tree generation unit 30 of the first embodiment, the third partial tree generation unit 32 generates a "tree" structure without performing node sharing processing for a graph (processing of integrating same data into one node).

Similar to the first embodiment, as the partial tree is generated by the third partial tree generation unit 32, flow data starting from one start point candidate (e.g. data "I·α·C") is generated by the partial tree integration processing of the partial tree integration unit 40.

As described above, similar to the first embodiment, in the third embodiment, a flow chart from even data in which data to be processed have a hierarchical structure can be generated. That is, in generating a partial tree rooted at the second term of binomial relation data in which start point candidate data of flow data is the first term, and when each node of the partial tree is set as a parent node candidate, the following (a) and (b) are executed.

(a) The processing target data corresponding to the second term data of binomial relation data whose first term data is identical to the processing target data corresponding to a parent node candidate or has an inclusion relation is connected as a child node of the parent node which is the first term data of the binomial relation data to the parent node.

(b) The correspondence type of binomial relation data having the processing target data corresponding to the parent node as the first term and the processing target data corresponding to the child node as the second node is added to an arc which connects the parent and child nodes, thereby generating the partial tree.

Fourth Embodiment

The third embodiment has been explained in which the flow data generation apparatus described in the first embodiment addresses the data having a hierarchical structure as processing targets. Next, fourth embodiment will be explained in which the flow data generation apparatus addresses the data having a hierarchical structure as processing targets. More concretely, in the configuration of the flow data generation apparatus described in the present embodiment, the redundant data deletion unit 31 described in the third embodiment is added to the flow data generation apparatus described in the third embodiment.

Figure 25:
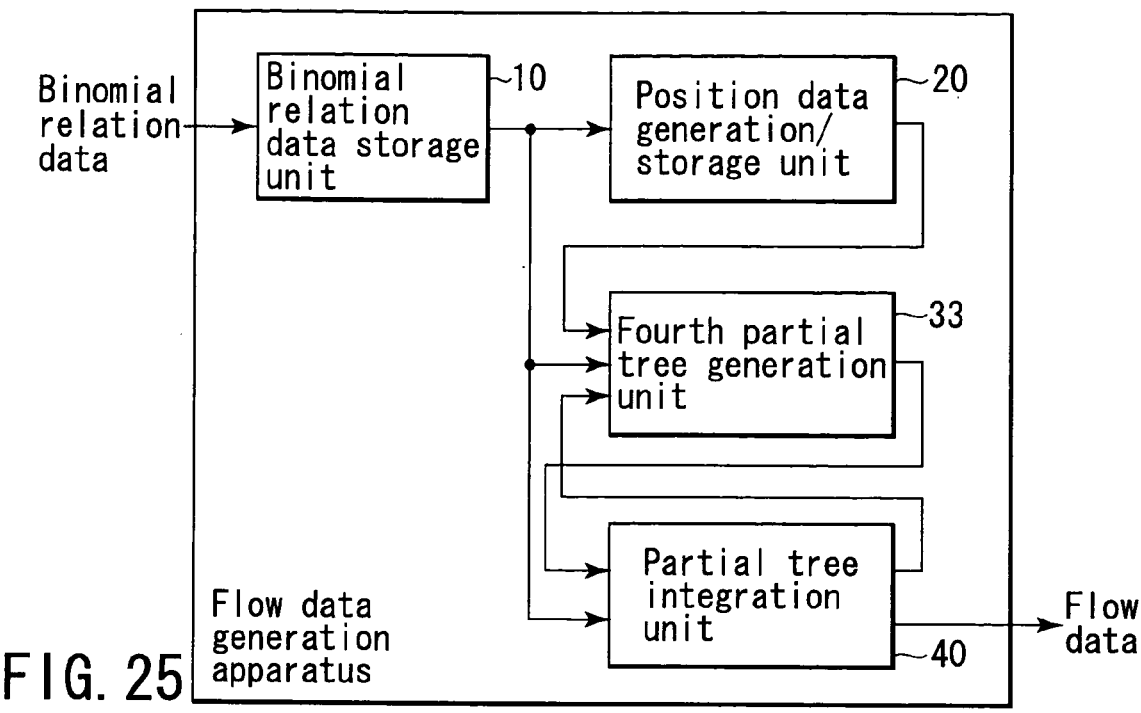
FIG. 25 is a block diagram showing a configuration example of a flow data generation apparatus according to the fourth embodiment of the present invention.

FIG. 25 shows a configuration example of a flow data generation apparatus according to the fourth embodiment. In FIG. 25, the same reference numerals as in FIG. 19 denote the same parts, and only a different part will be described. In FIG. 25, a fourth partial tree generation unit 33 replaces the third partial tree generation unit 32 of FIG. 19.

Figure 26:
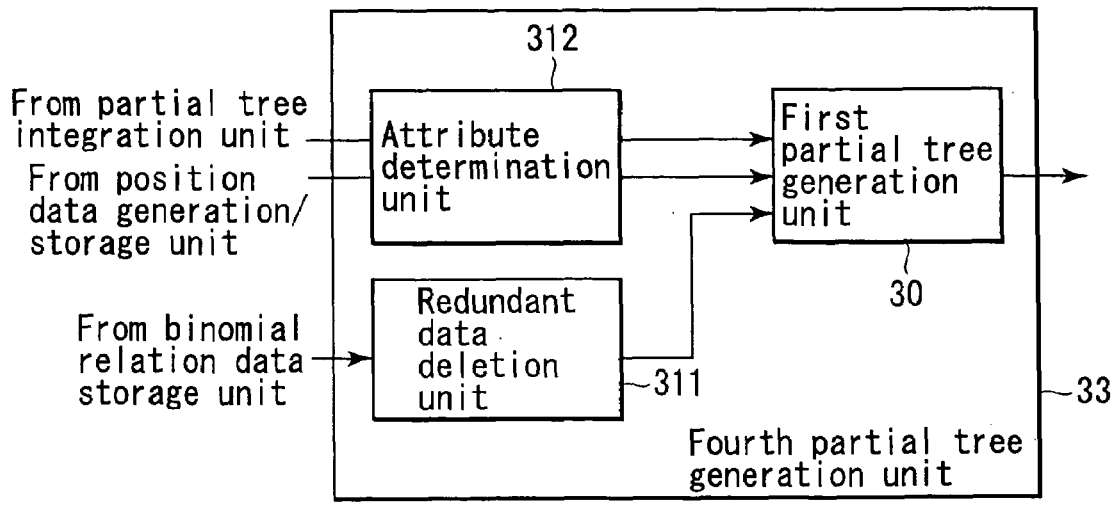
FIG. 26 is a block diagram showing a configuration example of the fourth partial tree generation unit according to the fourth embodiment.

FIG. 26 shows details of the configuration of the fourth partial tree generation unit 33. The fourth partial tree generation unit 33 comprises a first partial tree generation unit 30 described in the first embodiment, a redundant data deletion unit 311 described in the second embodiment, and an attribute determination unit 312 described in the third embodiment. In partial tree generation processing of the flow data generation apparatus described in the third embodiment, when binomial relation data whose first term data serves as parent node is searched, the redundant data deletion unit 311 is arranged such that binomial relation data which has been searched is excluded from partial tree generation targets.

When binomial relation data whose first term is identical to the parent node candidate data or with an inclusion relation is searched in the attribute determination unit 312 and first partial tree generation unit 30, the searched binomial relation data is excluded from next partial tree generation targets by the redundant data deletion unit 311.

Similar to the third embodiment, the attribute determination unit 312 determines whether first data is identical to second data, or includes the second data based on the sequence of these two data supplied to the attribute determination unit 312.

Processing operation of the fourth partial tree generation unit 33 will be explained with reference to the flow chart shown in FIG. 27.

Figure 27:
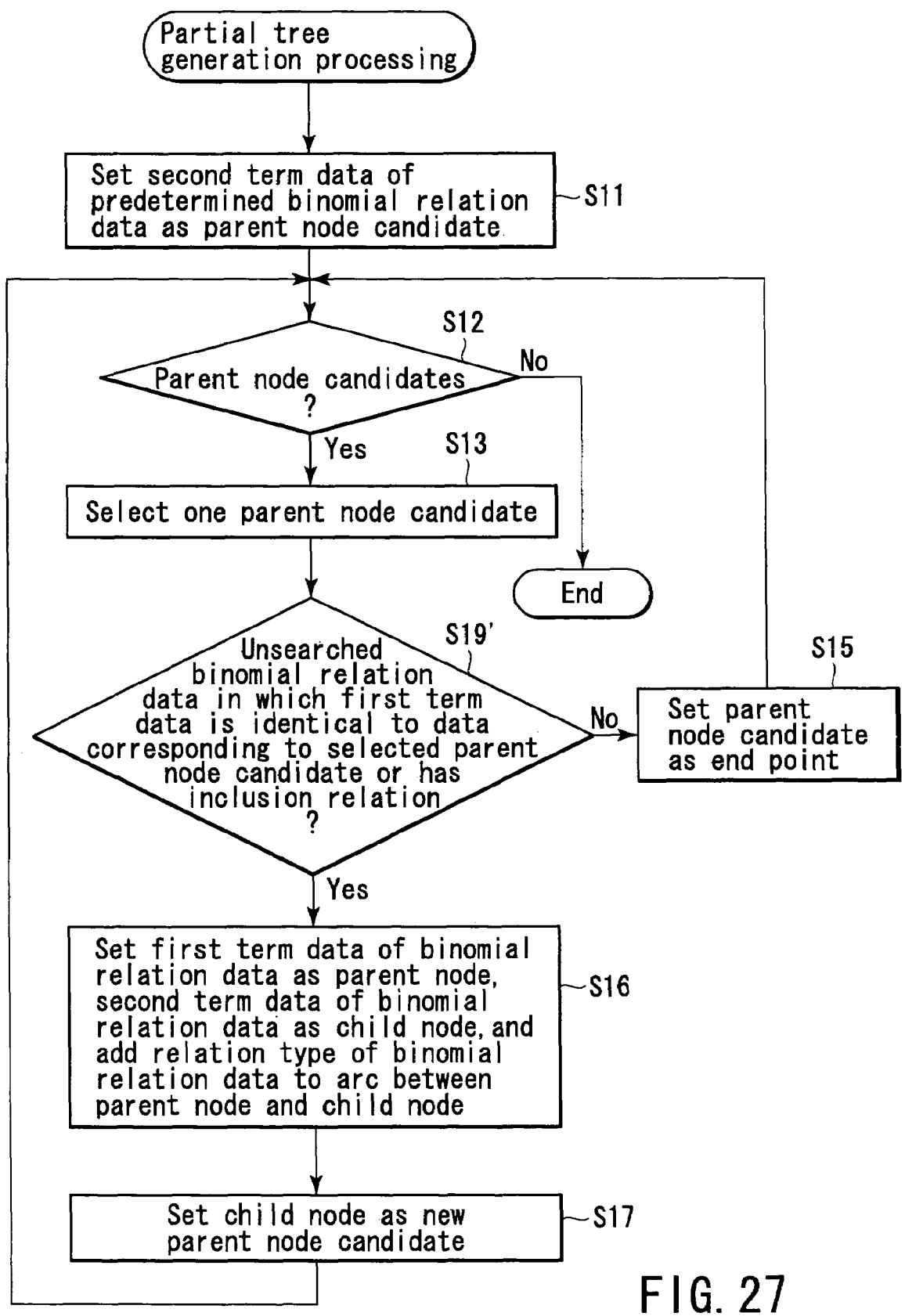
FIG. 27 is a flow chart for explaining processing operation of the fourth partial tree generation unit according to the fourth embodiment.

In FIG. 27, the same reference numerals as in FIG. 22 denote the same parts, and only a different part will be described. In FIG. 27, step S19' replaces step S19 in FIG. 22. In FIG. 27, if a parent node candidate is selected in step S12, unsearched binomial relation data is searched in step S19' in which data identical to the parent node candidate or having an inclusion relation is the first term. Thus, for example, binomial relation data searched in step S19' are obtained by excluding binomial relation data supplied from a partial tree integration unit 40 in step S11 and binomial relation data which has been searched in step S19' from a plurality of binomial relation data shown in FIG. 18.

Alternatively, in search of binomial relation data in step S19', binomial relation data supplied from the partial tree integration unit 40 in step S11 and binomial relation data which has been searched in step S19' may be excluded before search of binomial relation data in step S19'. Alternatively, the redundant data deletion unit 311 may check whether the searched binomial relation data is a redundant data (such as binomial relation data given by the partial tree integration unit 40 and binomial relation data which has been searched in step S19) or not after searching the binomial relation data including the first term identical or having an inclusion relation to the parent node candidate from all of the binomial relation data shown in FIG. 18. If the searched binomial relation data is redundant data, the redundant data deletion unit 311 does not output the binomial relation data to the first partial tree generation unit 30 to prevent redundant data from undergoing processes in step S19' and subsequent steps in the first partial tree generation unit 30. On the other hand, if the binomial relation data is not redundant data, the redundant data deletion unit 311 stores the searched binomial relation data in order to use it for detection of the next redundant data and outputs the searched binomial relation data to the first partial tree generation unit 30 to be subjected to processes in step S19' and subsequent steps in the first partial tree generation unit 30.

For example, similar to the third embodiment, a binomial relation data table shown in FIG. 18 is generated and stored in a binomial relation data storage unit 10. When a position data table shown in FIG. 21 is generated and stored in a position data generation/storage unit 20, the fourth partial tree generation unit 33 generates a partial tree as shown in FIG. 28.

Figure 28:
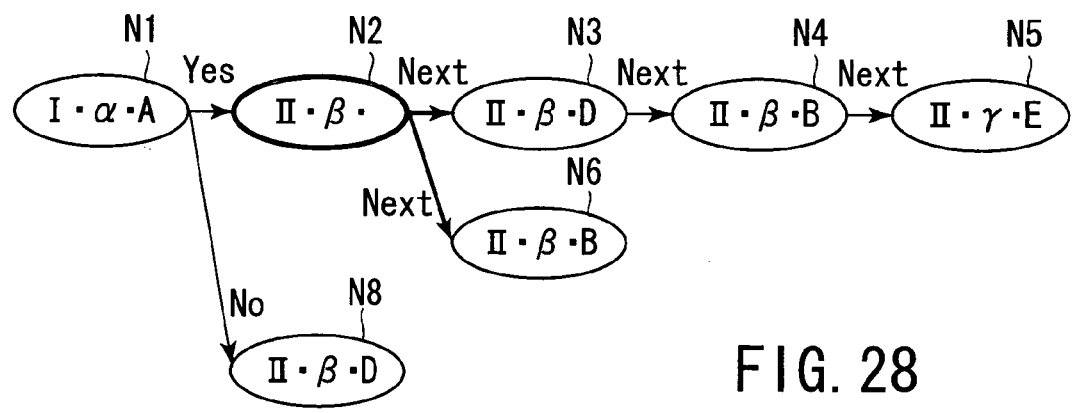
FIG. 28 is a view showing an example of a partial tree generated by the fourth partial tree generation unit according to the fourth embodiment.

Generation of a partial tree from a node N1 to a node N6 in FIG. 28 is the same as that in the third embodiment, and a description thereof will be omitted. However, letting the node N6 be a parent node candidate, binomial relation data in which data identical to the parent node candidate or having an inclusion relation is the first term (binomial relation data in the fifth row of FIG. 18) has already been used to generate the parentage between the nodes N4 and N5 (has already been searched). Hence, the binomial relation data is not searched, and the node N6 serves as an end point.

Letting the node N8 be a parent node candidate, binomial relation data in which data identical to the parent node candidate or having an inclusion relation is the first term (binomial relation data in the fourth row of FIG. 18) has already been used to generate the parentage between the nodes N3 and N4 (has already been searched). Hence, the binomial relation data is not searched and the node N8 serves as an end point.

Similar to the first partial tree generation unit 30 of the first embodiment, the fourth partial tree generation unit 33 generates a "tree" structure without performing node sharing processing for a graph (processing or integrating the same position data into one node).

Figure 29:
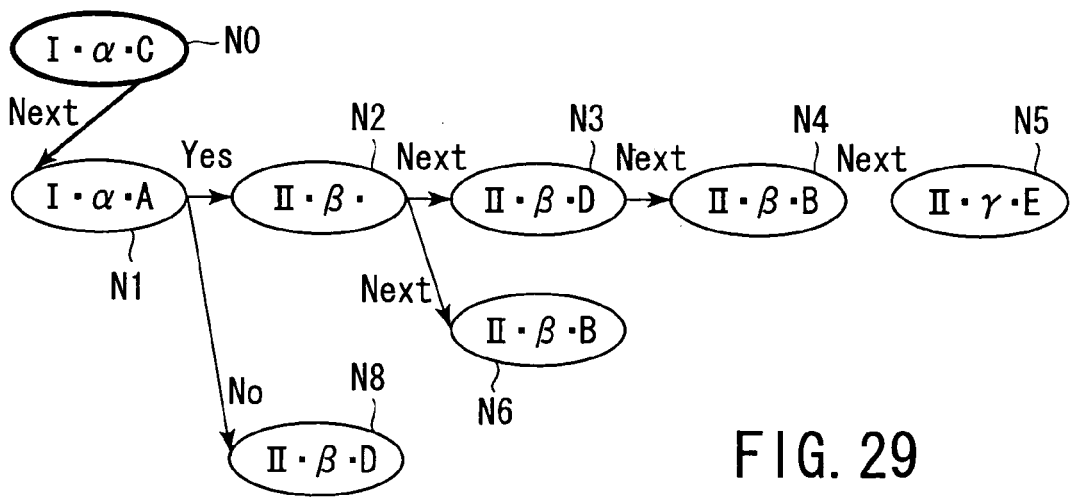
FIG. 29 is a view showing an example of flow data according to the fourth embodiment.

As the partial tree in FIG. 28 is generated in the fourth partial tree generation unit 33, the partial tree integration unit 40 generates flow data as shown in FIG. 29 starting from one start point node N0 (e.g. data "I·α·C") by partial tree integration processing.

As described above, similar to the second embodiment, in the fourth embodiment, flow data from even data in which data to be processed have a hierarchical structure can generated. Besides, a work flow serving as a data flow which puts importance on work contents can be easily created on the basis of binomial relation data identical to that used to generate a flow chart.

Fifth Embodiment

In flow data as shown in FIG. 11 generated by the flow data generation apparatus of the first embodiment, priority is given to procedure logic and use of same node repeatedly can be allowed in the flow data (first flow data) that is, a flow chart.

In flow data as shown in FIG. 17, a work in which same node occurs only once is organized to the flow data (second flow data), that is, a work flow.

In the fifth embodiment, a flow data apparatus which can generate the above two types of flow data.

Figure 30:
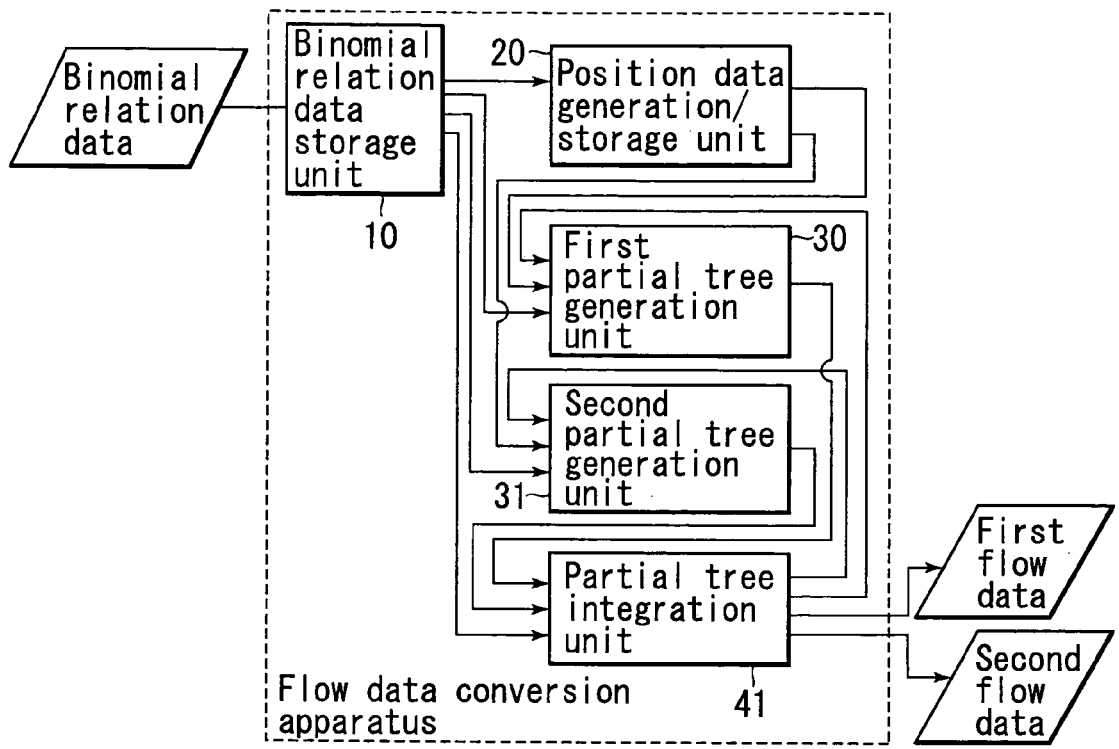
FIG. 30 is a block diagram showing a configuration example of a flow data generation apparatus according to the fifth embodiment of the present invention.

FIG. 30 shows a configuration example of the flow data generation apparatus according to the fifth embodiment. The same reference numerals as in FIG. 1 denote the same parts, and only a different part will be described. In FIG. 30, the flow data generation apparatus comprises second partial tree generation unit 31 described in the second embodiment in addition to a first partial tree generation unit 30. The first partial tree generation unit 30 performs processing in FIG. 7, and the second partial tree generation unit 31 performs processing in FIG. 15, thereby generating the first flow data and second flow data.

If the user inputs binomial relation data in order to create a flow chart, he can also obtain a work flow. If the user inputs binomial relation data in order to create a work flow, he can also obtain a flow chart. Thus, the flow data generation apparatus according to the fifth embodiment can be grasped as an apparatus which converts a flow chart into a work flow.

As shown in FIG. 30, the second partial tree generation unit 31 and first partial tree generation unit 30 are arranged parallel to each other. An input signal which is identical to an input signal of the first partial tree generation unit 30 is input to the second partial tree generation unit 31. Similar to an output signal from the first partial tree generation unit 30, an output signal from the second partial tree generation unit 31 is input to the partial tree integration unit 41.

The partial tree integration unit 41 integrates partial trees from the first partial tree generation unit 30 and second partial tree generation unit 31 respectively, and outputs flow data which conforms to each format. Although processing of integrating partial trees by the partial tree integration unit 41 is the same as that by the partial tree integration unit 40 described in the first and second embodiments in the meaning of integration of partial trees which conform to each format, both of which is different in that the partial tree integration unit 41 generates and outputs two types of flow data. Hence, the partial tree integration unit 41 is newly defined in the embodiment.

As described above, the fifth embodiment can simultaneously generate two types of flow data, i.e., a flow chart and work flow from the same binomial relation data.

Sixth Embodiment

Similar to the fifth embodiment, by combining the third and fourth embodiments, even in a flow data generation apparatus which addresses data having a hierarchical structure as processing objects, both a flow chart and work flow can be generated from one binomial relation table at the same time as described above.

The sixth embodiment will describe the flow data generation apparatus which processes data having a hierarchical structure and can generate the two types of flow data.

Figure 31:
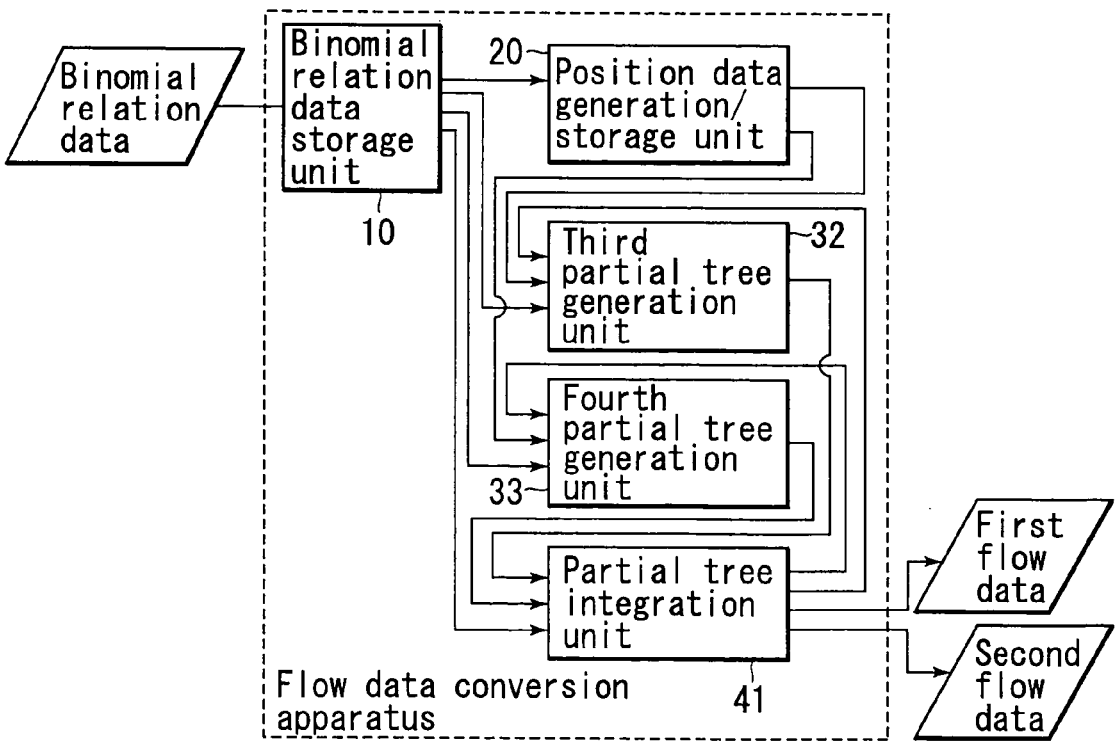
FIG. 31 is a block diagram showing a configuration example of a flow data generation apparatus according to the sixth embodiment of the present invention.

FIG. 31 shows a configuration example of the flow data generation apparatus according to the sixth embodiment. The same reference numerals as in FIG. 19 denote the same parts, and only a different part will be described. That is, in FIG. 31, the flow data generation apparatus comprises a fourth partial tree generation unit 33 described in the fourth embodiment in addition to a third partial tree generation unit 32. The third partial tree generation unit 32 performs processing in FIG. 22, and the fourth partial tree generation unit 33 performs processing in FIG. 27, thereby generating first and second flow data.

If the user inputs binomial relation data in order to create a flow chart, he can also obtain a work flow. If the user inputs binomial relation data in order to create a work flow, he can also obtain a flow chart. Thus, the flow data generation apparatus according to the sixth embodiment can be grasped as an apparatus which converts a flow chart into a work flow.

As shown in FIG. 31, the fourth partial tree generation unit 33 and third partial tree generation unit 32 are arranged parallel to each other. An input signal which is identical to an input signal of the third partial tree generation unit 32 is input to the fourth partial tree generation unit 33. Similar to an output signal from the third partial tree generation unit 32, an output signal from the fourth partial tree generation unit 33 is input to the partial tree integration unit 41.

The partial tree integration unit 41 integrates third partial trees generated by the third partial tree generation unit 32 and fourth partial tree generation unit 33, and outputs two types of flow data. Although processing of integrating partial trees by the partial tree integration unit 41 is the same as that by the partial tree integration unit 40 described in the fourth embodiment in the meaning of integration of partial trees which conform to each format, both of which is different in that the partial tree integration unit 41 generates and outputs two types of flow data. Hence, the partial tree integration unit 41 is newly defined in the embodiment.

As described above, the sixth embodiment can simultaneously generate two types of flow data, i.e., a flow chart and work flow from binomial relation data in which data to be processed has a hierarchical structure.

Seventh Embodiment

The seventh embodiment concerns a flow data generation apparatus having a function of reducing identical nodes into one for flow data such as flow data shown in FIG. 17 generated by a flow data generation apparatus (see FIG. 13) of the second embodiment and flow data shown in FIG. 29 generated by a flow data generation apparatus (see FIG. 25) of the fourth embodiment.

That is, for example, the partial tree integration unit 40 as shown in FIG. 13 or 25 checks nodes of the generated flow data one by one. The partial tree integration unit 40 deletes, from the flow data, nodes which appear for the second and subsequent times out of two or more nodes having the same data. The partial tree integration unit 40 redirects arcs (branches, lines, or sides) directed to the nodes which appear for the second and subsequent times to a node which appears for the first time. Consequently, graph data is generated.

Processing of the partial tree integration unit 40 will be explained with reference to a flow chart in FIG. 32. The processing can be facilitated using a so-called "list".

First, e.g., numbers (node numbers) as identifiers for identifying respective nodes are sequentially assigned to the nodes of the flow data as shown in FIG. 17 or 29. At this state, unchecked status are set to the respective nodes (step S41). Then, processes in steps S43 to S46 to be described below are repeated until the flags of all the nodes are changed to the checked status (step S42).

In step S43, one of unchecked nodes is selected based on, e.g., the node number order, and the following processing is executed for the selected node. If data which coincides with data of the selected node exists in checked nodes (step S44), the partial tree integration unit 40 redirects an arc directed to the selected node to the checked node whose data coincides with the data corresponding to the selected node. Further, the partial tree integration unit 40 deletes the selected node from the flow data (step S45). The partial tree integration unit 40 sets the selected node to the checked status (step S46), and returns to step S42. If no data which coincides with data of the selected node exist in checked nodes (step S44), the partial tree integration unit 40 advances to step S46, sets the selected node to the checked status, and returns to step S42.

If all the nodes have not been checked (step S42), the partial tree integration unit 40 selects one of unchecked nodes in the node number order. The partial tree integration unit 40 executes processes in steps S44 to S46 for the selected node as a new processing target (step S43).

For example, the flow data in FIG. 17 has two nodes corresponding to data B. In the first node, data A serves as a parent node. In the second node, data D serves as a parent node. Thus, in this case, an arc directed to the second node (arc from the data D to the data B) is redirected to the first node in step S46 of FIG. 32. As shown in FIG. 33, an arc is connected from the data D to the first node corresponding to the data B.

Figure 34:
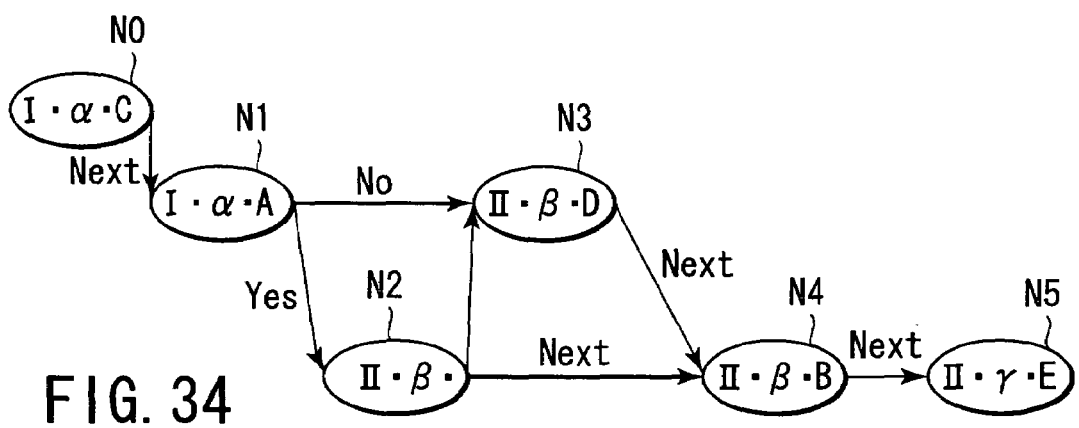
FIG. 34 is a view showing a graph generated from flow data shown in FIG. 29 according to the seventh embodiment.

In the flow data shown in FIG. 29, nodes corresponding to data "II·β·D" are the nodes N3 and N8. Nodes corresponding to data "II·β·B" are the nodes N4 and N6. In step S45 of FIG. 32, an arc directed from the node Ni to the node N8 is redirected to the node N3. That is, as shown in FIG. 34, an arc is connected from the node Ni to the node N3. In step S45 of FIG. 32, an arc directed from the node N2 to the node N6 is redirected to the node N4. That is, as shown in FIG. 34, an arc is connected from the node N2 to the node N4.

In the flow data shown in FIGS. 17 and 29, nodes at which the same data appears for the second and subsequent times do not have any child node. For this reason, problems such as the absence of an arc in subsequent node check do not occur.

Figure 35:
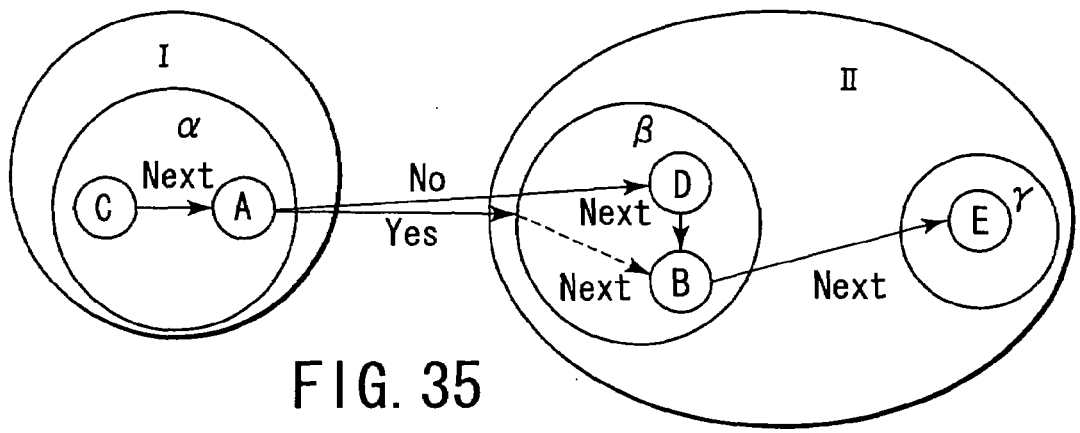
FIG. 35 is a view showing another example of the graph generated from the flow data shown in FIG. 29 according to the seventh embodiment.

Flow data shown in FIG. 34 can also be expressed as shown in FIG. 35 by, for example, utilizing a tool having a graphic function. That is, each data can be expressed by a set relation corresponding to a class attribute based on the class attribute of data corresponding to each node. As a result, an arc between layers can also be expressed. Note that a dotted line represents the arrow of an arc from an upper class. When the set relation is expressed by a figure, an arc directly from an upper class may be omitted. Even if an arc from an upper class is omitted, the graphically same effect as the arc can be obtained.

Figure 32:
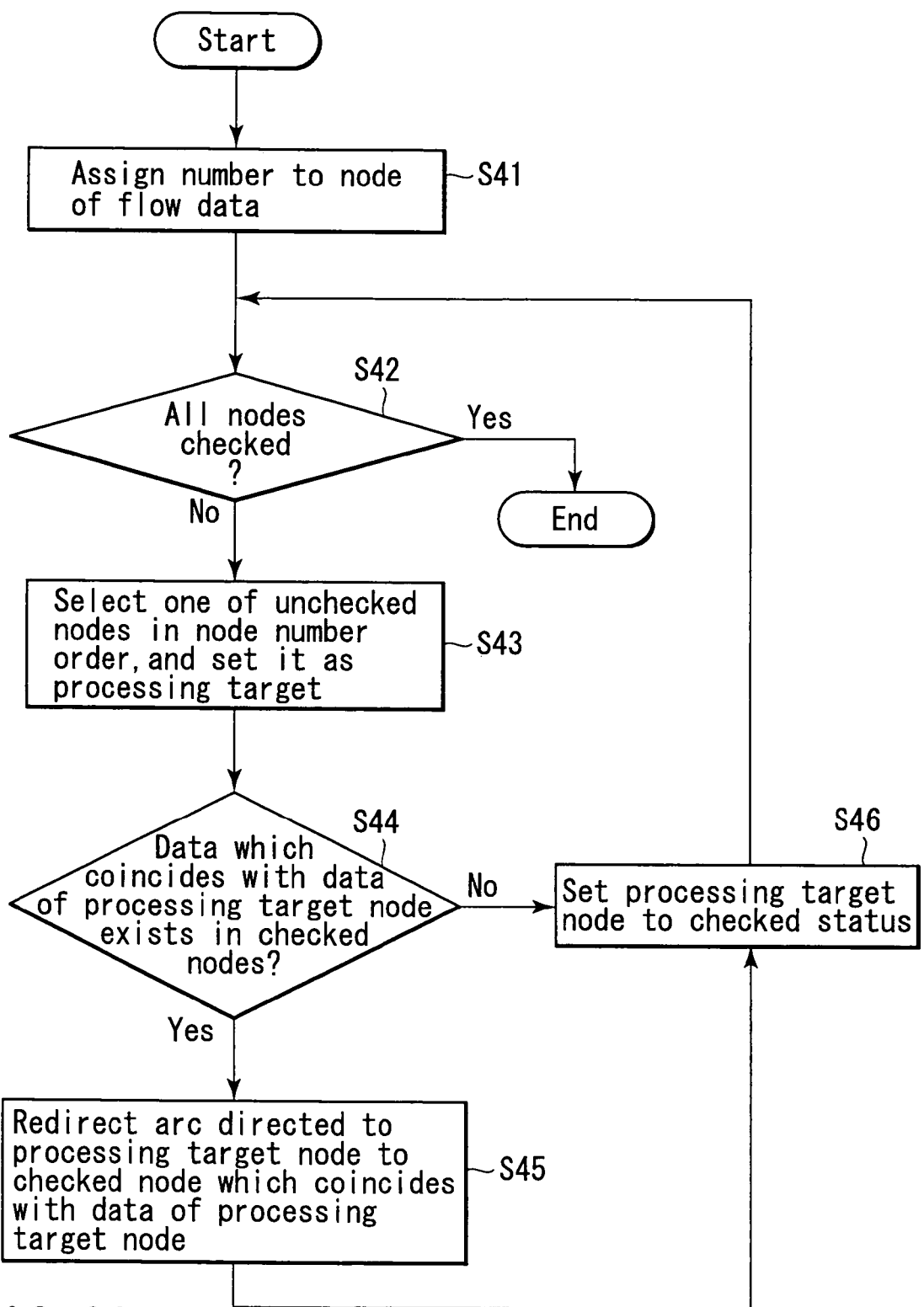
FIG. 32 is a flow chart for explaining graph generation processing operation according to the seventh embodiment of the present invention.
Figure 33:
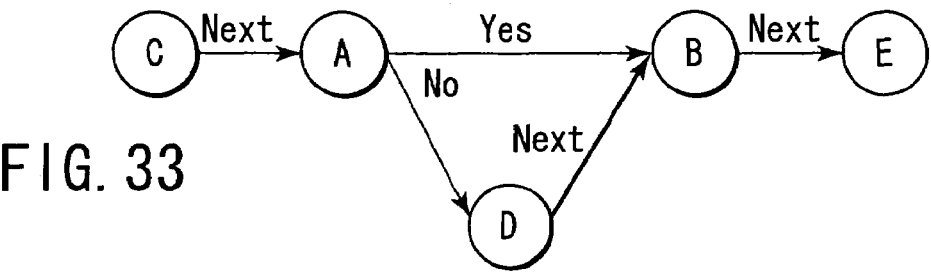
FIG. 33 is a view showing a graph generated from flow data shown in FIG. 17 according to the seventh embodiment.

Processing in FIG. 32 can be executed by a partial tree integration unit 41 (see FIG. 31) in the sixth embodiment, and this case is the same as the above.

As described above, according to the seventh embodiment, a so-called graph formed by putting a plurality of identical nodes together into one in a work flow can be easily generated from the work flow.

Summary of the First to Seventh Embodiments

According to the first to seventh embodiments, if the user describes respective binomial relation data, the relations between the binomial relation data can be automatically linked. The user need not link the data while assuming the whole structure. By inputting binomial relation data, a data tree created from repetitive identical partial trees and a data tree created without any repetitive identical partial trees can be created from the same input data. Hence, a condition logic priority flow and processing priority flow can be selectively used in creation and utilization. The user need not rearrange nodes together for each processing, reducing the burden on a brain of the flow creator. Although the data amount is large for a few experts, individual data can be easily input by many persons at various standpoints. In addition, these individual data can be uniformly processed.

The flow data generation apparatus described in the above embodiments of the present invention can be distributed by storing a program capable of causing a computer to function as the flow data generation apparatus in a recording medium such as a magnetic disk (floppy disk, hard disk, or the like), an optical disk (CD-ROM, DVD, or the like), or a semiconductor memory. That is, program codes which realize the functions of the building components described in each embodiment or processing steps shown in each flow chart are recorded on a recording medium. This recoding medium is executed by a processor, causing the processor to function as an apparatus which executes creation of flow data.

Figure 42A:
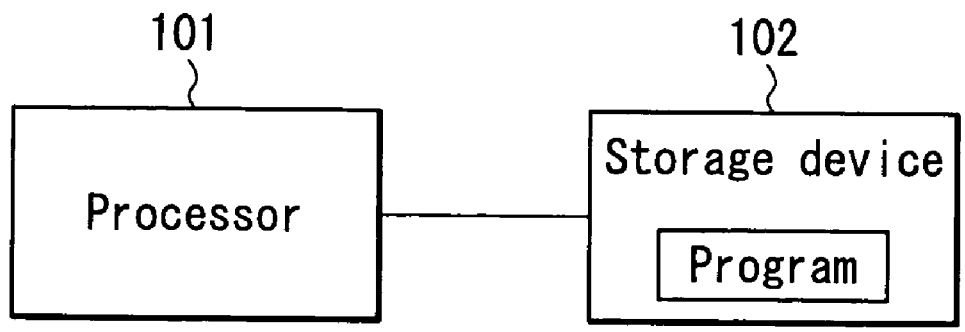
FIGS. 42A and 42B are block diagrams showing configuration examples for realizing each embodiment.
Figure 42B:
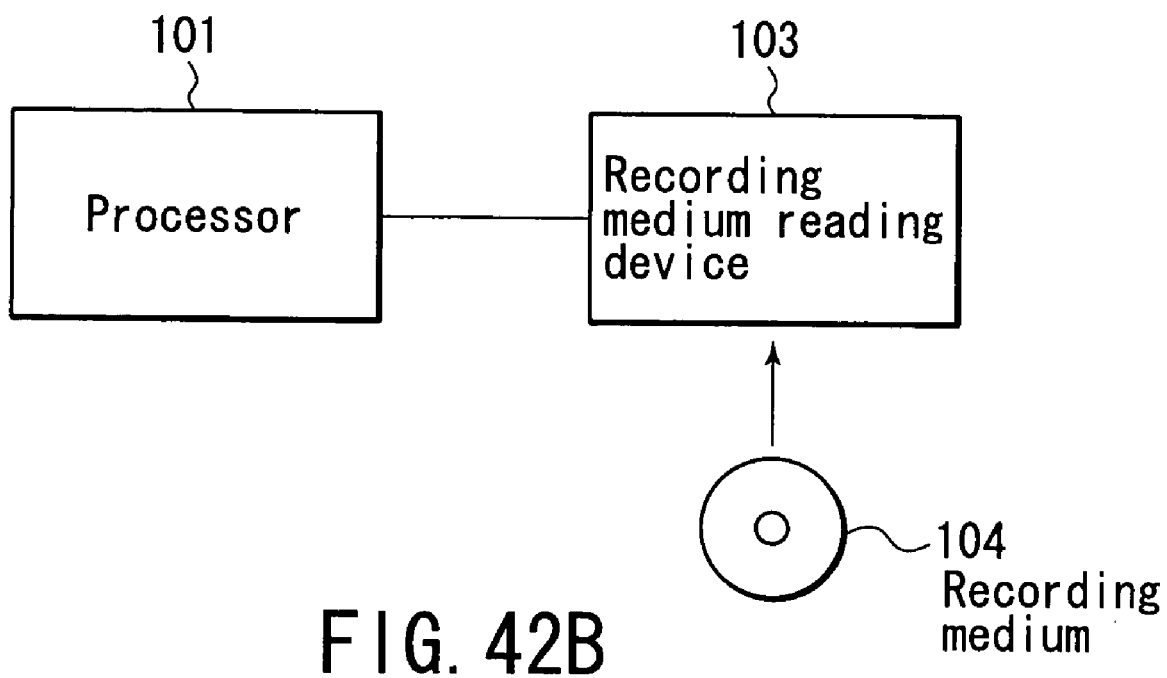

For example, as shown in FIG. 42A, a program for causing a processor 101 or storage device 102 to function as a binomial relation data storage unit 10, position data generation/storage unit 20, first partial tree generation unit 30, and partial tree integration unit 40 is stored in the storage device 102 connected to the processor 101. Alternatively, as shown in FIG. 42B, the program may be stored in a recording medium 104 instead of the storage device 102, read out by a recording medium reading device 103, and executed by the processor 101.

As described above, according to the first to seventh embodiments, flow data such as a flow chart and work flow may be easily generated based on input data.

Eighth Embodiment

The eighth embodiment is related to a concrete embodiment to which the first to seventh embodiments are applied. In the above embodiments, the contents of binomial relation data and a concrete display example have not particularly been described. The eighth embodiment provides a concrete example.

The features of the first to seventh embodiments are as follows.

(1) Hierarchical structure expression can be utilized, and even a complicated target can be easily expressed by a flow.

(2) A plurality of arrows can be processed, and a composite data flow can be expressed.

(3) The binomial relation unit allows easily deleting or adding data.

(4) A flow can be instantaneously expressed, and can be changed online in using it in a manual or the like.

Considering these features (1) to (4), the first to seventh embodiments are applied to a procedure manual creation apparatus as an application example.

A procedure manual which describes equipment procedures or a troubleshooting manual is created according to the first to seventh embodiments. Such manual can provide an easy-to-see display and is also convenient for maintenance such as data change. Most procedure manuals and other manuals are "edited" for good appearance rather than the uniformity of data structure expressions in the final stage.

Editing work is manually done by the skilled person, which poses a problem in manual creation.

From the standpoint of slightly sacrificing the appearance, the eighth embodiment allows the original data creator to generate a data flow as a manual by pressing one button. A configuration for realizing this has been described in the first to seventh embodiments, and a detailed description thereof will be omitted.

FIGS. 36A to 39 are views for explaining an application example in which the first to seventh embodiments are applied to a video programming procedure manual according to the eighth embodiment.

Figure 36B:
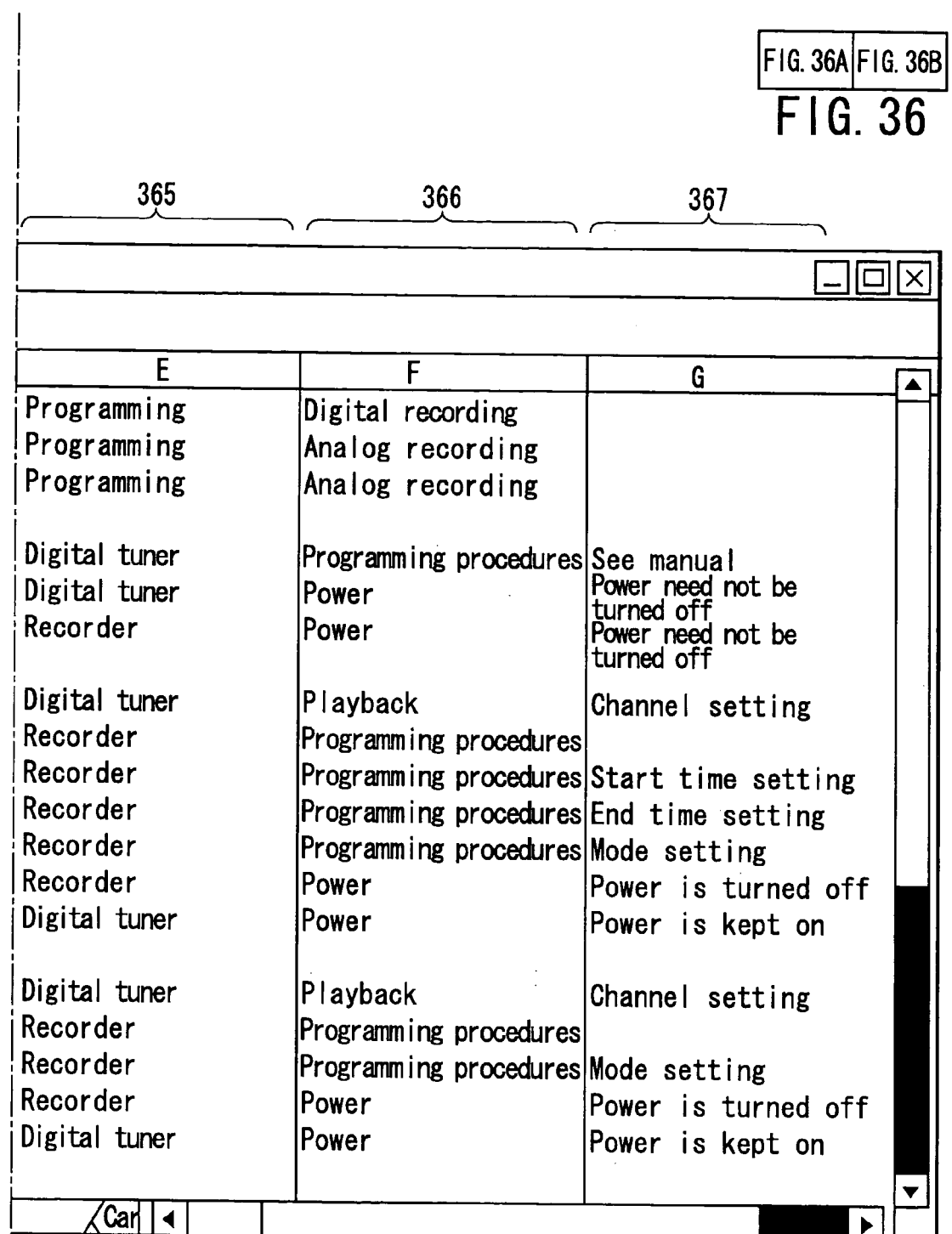

FIGS. 36A and 36B show binomial relation data of procedures regarding some of programming procedures which assume a digital video recorder. For descriptive convenience, one display screen is illustrated by dividing into FIGS. 36A and 36B. In FIGS. 36A and 36B, binomial relation data are described in the spreadsheet sheet of a spreadsheet tool. One row forms one binomial relation data, and a plurality of rows form a set of binomial relation data.

Columns 361 to 363 represent the first term data, and columns 365 to 367 represent the second term data. A column 364 represents the type of binomial relation between the first and second term data, and is expressed by a numerical value. The first term data is expressed by three layers of the columns 361, 362, and 363 sequentially from the uppermost layer. The second term data is expressed by three layers of the columns 365, 366, and 367 sequentially from the uppermost layer.

The execute form of an algorithm as described in the first to seventh embodiments is so set as to be activated with a menu button or the like. Obtained flow data is output in a GUI tool format.

Figure 37:
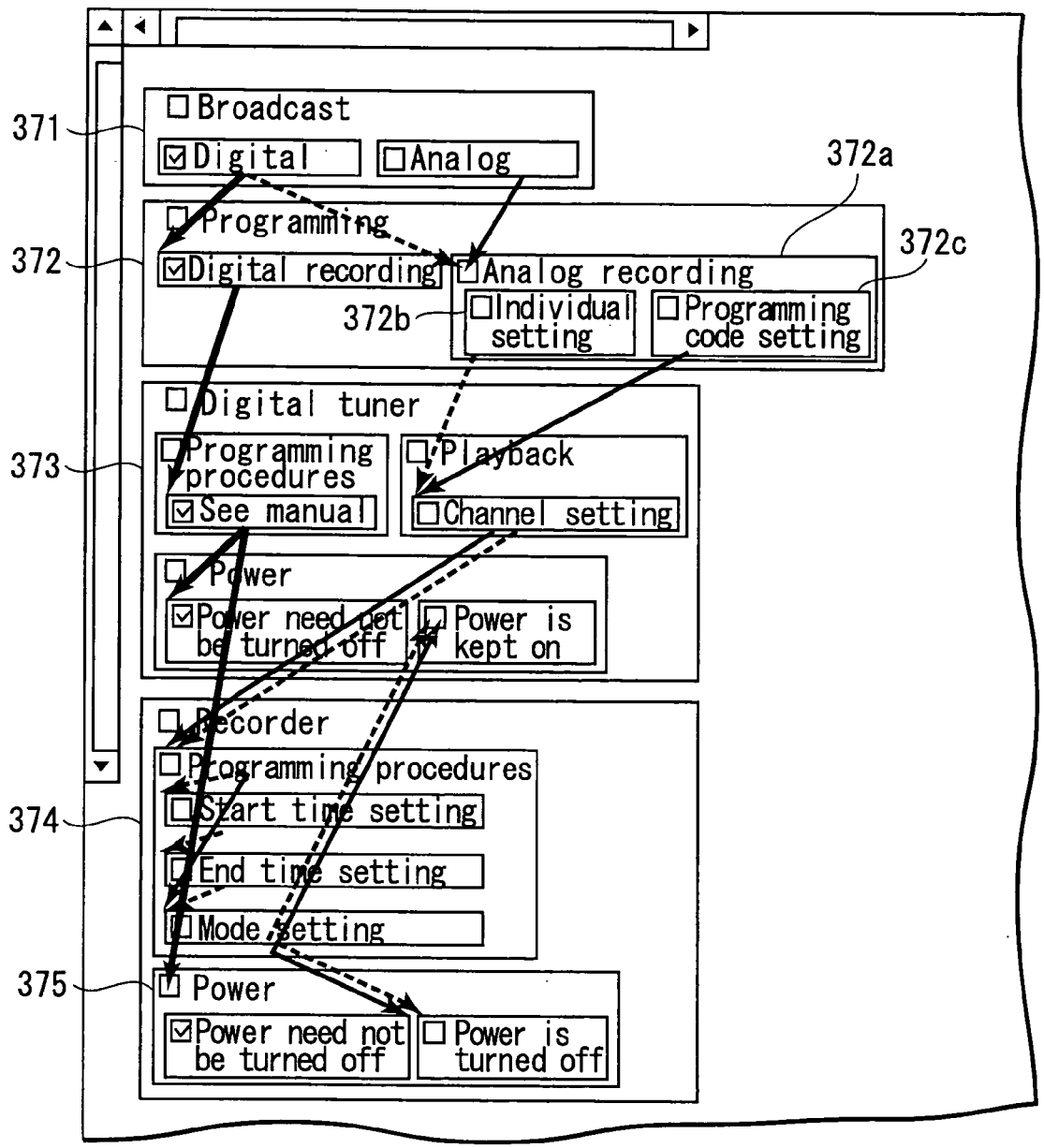
FIG. 37 is a view showing an example of flow data obtained on the basis of the binomial relation data of FIGS. 36A and 36B according to the eighth embodiment.

FIG. 37 is a view showing an example of the obtained flow data.

In FIG. 37, one node is expressed by a check box and accompanying message.

In the expression of FIG. 37, common data items are expressed within one frame, and five data items in frames 371 to 375 are described. For example, "digital recoding" and "analog recording" are described in the "programming" frame 372. An "individual setting" frame 372b and "programming code setting" frame 372c are described in an "analog recording" frame 372a. In this manner, data having a hierarchical structure can be expressed at once, realizing feature (1).

In FIG. 37, a series of processes in digitally programming a digital broadcast are checked and expressed by bold solid arrows. When another programming method is adopted, e.g., a digital broadcast is to be analog-programmed, the user follows broken arrows. Even when series of work operations exist as choices in programming, they can be summarized and expressed without creating separate manuals. The user can easily grasp "programming" at once, realizing feature (2).

In the eighth embodiment, arrows are written and expressed over labels. Alternatively, arrows are not overwritten in shaping, or the background color or character color of a corresponding label can also be used.

FIGS. 38A and 38B show views in which data on "programming code" are deleted from data of FIGS. 36A and 36B, and "remote control programming" (programming is set with a remote controller or the like) and "quick programming" (programming functions are limited but programming can be set within the shortest time) are added. For descriptive convenience, one display screen is illustrated by dividing into FIGS. 38A and 38B. In deletion, data may be erased, but is commented out in FIGS. 38A and 38B. A sign which designates comment-out is a "?" mark in FIGS. 38A and 38B, and added to binomial relation data in the 18th to 22nd rows.

Figure 39:
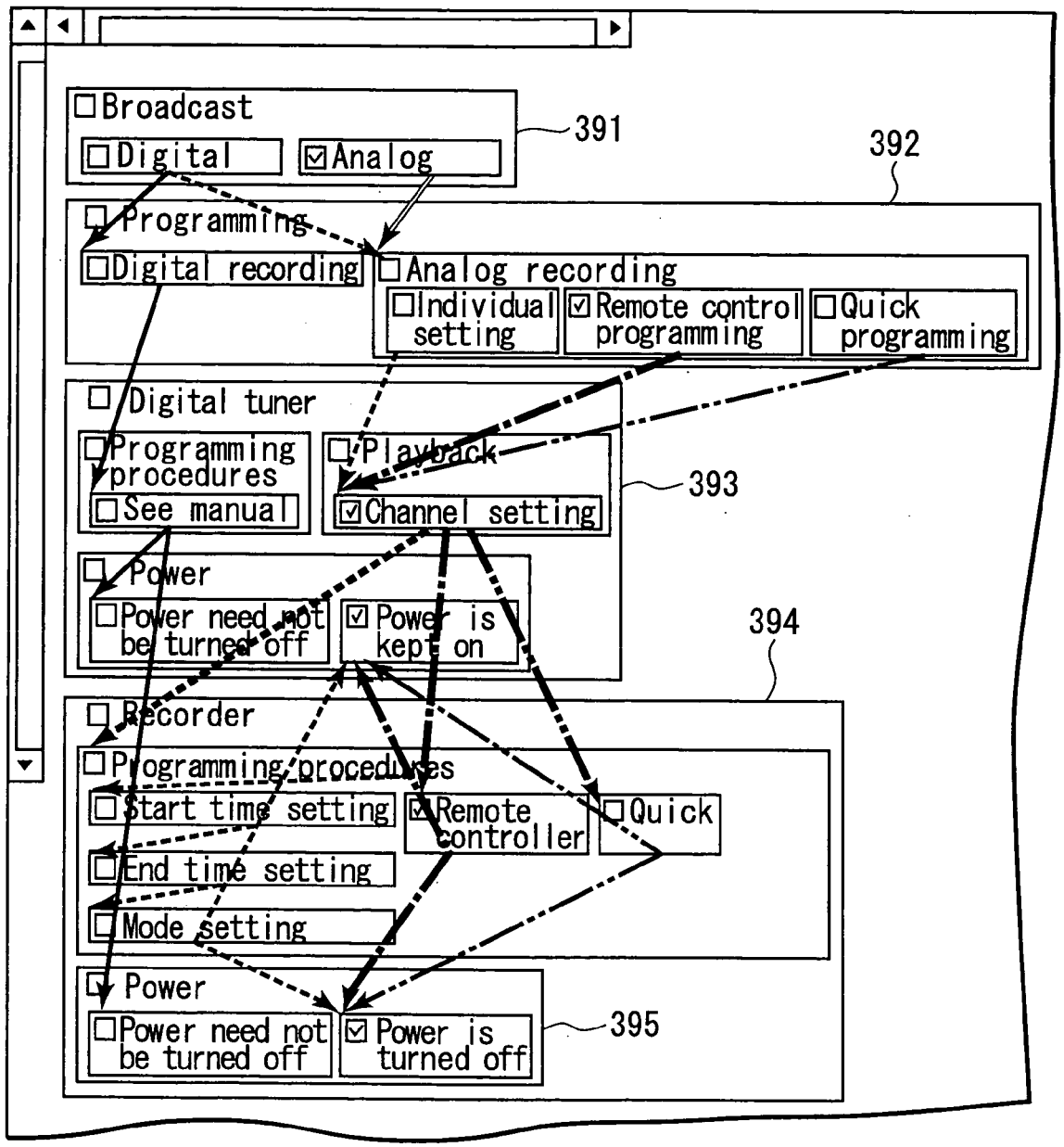
FIG. 39 is a view showing an example of flow data obtained on the basis of the binomial relation data of FIGS. 38A and 38B according to the eighth embodiment.

In data addition, binomial relation data is directly added to original data. That is, for example, binomial relation data is input to one row of the spreadsheet sheet on the screen, completing addition of the binomial relation data. As a result, flow data shown in FIG. 39 is obtained.

In most conventional manuals, flow data is directly drawn using a GUI editor. Even slight deletion/addition of original data requires recreation of the whole data. A graph or tree drawing tool directly utilizing the graph theory is available, but is not employed in manuals having complicated data structures or the like because no hierarchical structure can be expressed and the number of arcs (arrows) between nodes is limited. According to the method of the eighth embodiment, flow data is automatically corrected by individually deleting/adding binomial relation data. Feature (3) is therefore realized.

Ninth Embodiment

The ninth embodiment is related to another concrete embodiment to which the first to seventh embodiments are applied. In the above embodiments, the contents of binomial relation data and a concrete display example have not particularly been described. The ninth embodiment provides a concrete example. As an application example, the ninth embodiment is applied to an interactive instruction system.

By applying the ninth embodiment to a terminal at a call center or the like, information can be presented as a data flow in real time via the Internet. Voice can only sequentially provide information, and is inconvenient for information containing many condition branches. When a network system capable of utilizing WWW pages or exchanging images can be adopted, pieces of information and their links are converted into binomial relation data in real time. The binomial relation data are transmitted as a data flow to a terminal, thereby instantaneously presenting the data flow to the user.

The ninth embodiment will be explained on the basis of a case in which software operation instructions at a terminal are expressed by binomial relation data. For example, operation instructions for copying a plurality of files are as follows.

Operation instruction 1: The icon of a file 1 is clicked (highlighted).

Operation instruction 2: The icon of a file 2 is clicked (highlighted) while the Ctrl key is pressed.

Operation instruction 3: The icon of a file 3 is clicked (highlighted) while the Ctrl key is pressed.

Operation instruction 4: The selected (highlighted) icons are clicked and kept pressed.

Operation instruction 5: While the icons are kept pressed, the mouse is dragged to a copying destination folder.

Operation instruction 6: After the folder is highlighted, the kept icons are released.

Operation instruction 7: Copying is completed.

FIG. 40 is a view showing binomial relation data representing operation instructions 1 to 7 of copying three files to another folder. Binomial relation data are input from a keyboard to a spreadsheet sheet.

In FIG. 40, binomial relation data are described in the spreadsheet sheet of a spreadsheet tool. One row forms one binomial relation data, and a plurality of rows form a set of binomial relation data.

Columns 401 to 403 represent the first term data, and columns 405 to 407 represent the second term data. A column 404 represents the type of binomial relation between the first and second term data, and is expressed by a numerical value.

The first term data is expressed by three layers of the columns 401, 402, and 403 sequentially from the uppermost layer. The second term data is expressed by three layers of the columns 405, 406, and 407 sequentially from the uppermost layer.

The use of voice input is more convenience at, e.g., a call center.

Figure 41:
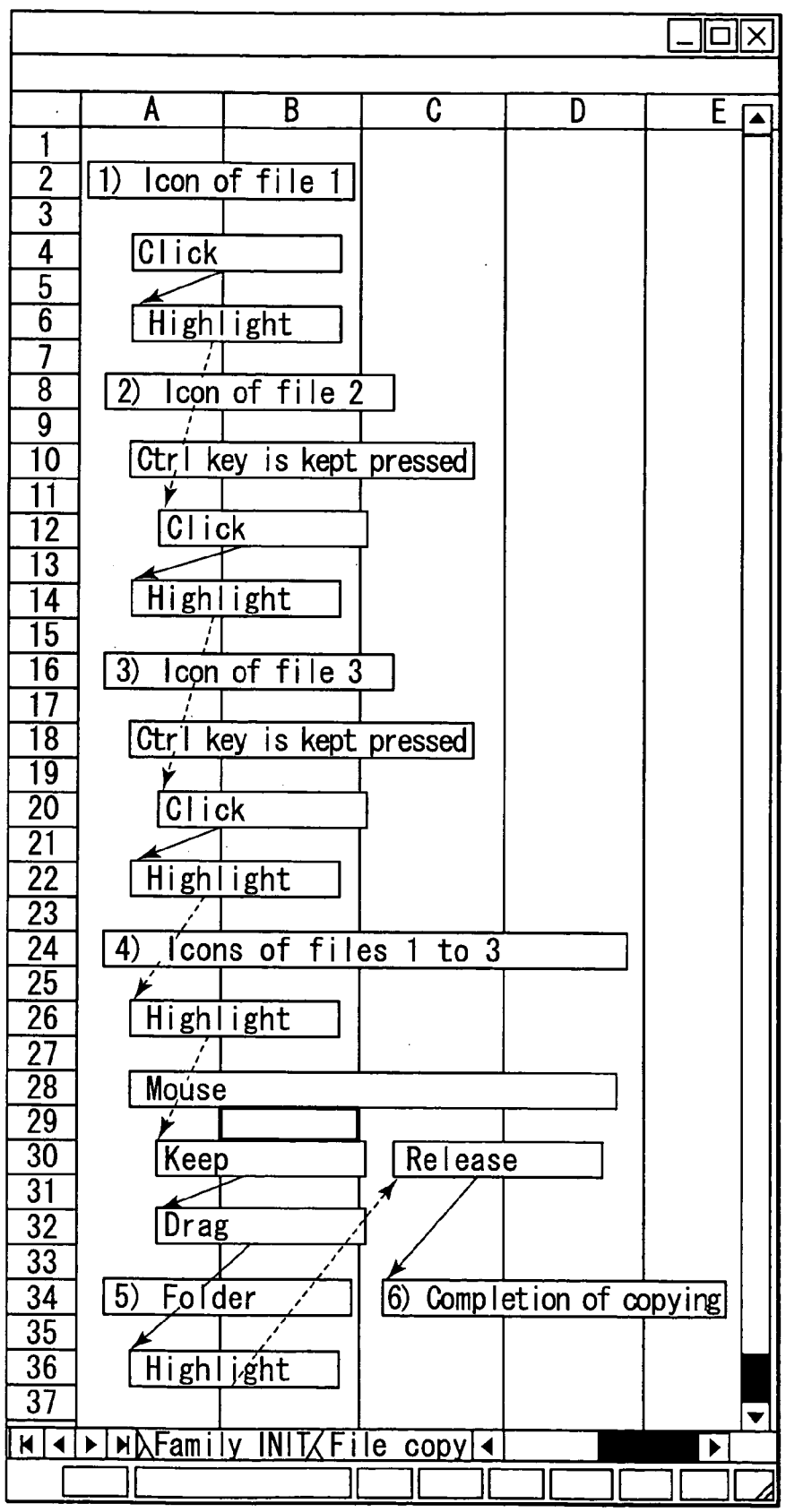
FIG. 41 is a view showing the data flow of the binomial relation data of FIG. 40 according to the ninth embodiment.

FIG. 41 shows the data flow of binomial relation data in FIG. 40. Arrows are drawn by solid and broken lines such that solid lines represent instructions based on mouse operation and broken lines represent other related instructions. In this manner, pieces of information having a complicated relation can be expressed sequentially like a natural language (voice), and also graphically immediately. Pieces of information can be presented online in an easy-to-understand format, realizing feature (4) described in the eighth embodiment.

As described above, the ninth embodiment can easily create, from the same input data, a flow chart serving as flow data which puts importance on a logical flow containing branch conditions along the thought of the flow data creator, and a work flow serving as flow data which puts importance on the procedures of easy-to-understand work contents along the thought stream of the flow data creator.

What is claimed is:

1. A flow data generation method, comprising:
   (a) storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;
   (b) extracting first binomial relation data including first term data to be a start point of flow data from the set of binomial relation data in the first storage unit;
   (c) associating the start point as a first parent node with second term data of the first binomial relation data as a first child node;
   (d) adding a relation type of the first binomial relation data to an arc of the first binomial relation data;
   (e) searching the set of the binomial relation data in the first storage unit for third binomial relation data including first term data identical to second term data of second binomial relation data by referring to the position data in the second storage unit;
   (f) associating the first term data of the third binomial relation data as a second parent node with second term data of the third binomial relation data as a second child node;
   (g) adding a relation type of the third binomial relation data to an arc of the third binomial relation data;
   (h) repeating the (e) searching, (f) associating, and (g) adding to generate a partial tree including a root identical to the second term data of the first binomial relation data; and
   (i) displaying the particle tree.

2. A method according to claim 1, wherein the (h) repeating includes stopping the (e) searching based on the third binomial relation data when the third binomial relation data has no second term data or the third binomial relation data including the first term data identical to the second term data of the second binomial relation data has not been found.

3. A method according to claim 1, wherein the (b) extracting includes:
   generating a matrix comprising a plurality of matrix elements having first matrix elements having data "0" defined by first row elements corresponding to the first term data and first column elements corresponding to the second term data, and second matrix elements having other than data "0" defined by other than the first row elements and first column elements when each row is assigned to first term data and each column is assigned to second term data;
   selecting data corresponding to one or a plurality of second row elements having a column sum "0" as one or a plurality of start point candidates;
   selecting the start point from the start point candidates if the plurality of start point candidates exist;
   determining the start point candidate as the start point if one start point candidate exist; and
   determining the start point by a predetermined procedure if no start point candidate exists.

4. A flow data generation method, comprising:
   (a) storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;
   (b) extracting first binomial relation data including first term data to be a first start point candidate of flow data from the set of binomial relation data in the first storage unit;
   (c) associating the first start point candidate as a first parent node with second term data of the first binomial relation data as a first child node;
   (d) adding a relation type of the first binomial relation data to an arc of the first binomial relation data;
   (e) searching the set of the binomial relation data in the first storage unit for third binomial relation data including first term data identical to second term data of the second binomial relation data by referring to the position data in the second storage unit;
   (f) associating the first term data of the third binomial relation data as a second parent node with second term data of the third binomial relation data as a second child node;
   (g) adding a relation type of the third binomial relation data to an arc of the third binomial relation data;
   (h) repeating the (e) searching, (f) associating, and (g) adding to generate a first partial tree including a first root identical to the second term data of the first binomial relation data;
   (i) generating a first data tree including a second root identical to the first start point candidate based on the first partial tree;
   (b') extracting fourth binomial relation data including first term data to be a second start point candidate of flow data from the set of binomial relation data in the first storage unit;
   (c') associating the second start point candidate as a third parent node with second term data of the fourth binomial relation data as a third child node;
   (d') adding a relation type of the fourth binomial relation data to an arc of the fourth binomial relation data; (h') repeating the (e) searching, (f) associating, and (g) adding to generate a second partial tree including a third root identical to the second term data of the fourth binomial relation data;
   (i') generating a second data tree including a fourth root identical to the second start point candidate based on the second partial tree;
   (j) selecting one candidate from the first and second start point candidates as the start point;

(k) associating the start point and the defeated start point candidate, adding a relation type of binomial relation data between the start point and the defeated start point candidate to an arc between the start point and the defeated start point candidate, and integrating the first and second data trees into a third data tree; and (l) displaying the first and second partial trees.

5. A method according to claim 1, wherein the (h) repeating includes searching the set of the binomial relation data in the first storage unit for third binomial relation data including first term data of the third binomial relation data identical to second term data of second binomial relation data by referring to the position data in the second storage unit and checking whether the third binomial relation data has been searched;

associating second term data of the third binomial relation data as a second child node with the first term data of the third binomial relation data as a second parent node, adding a relation type of the third binomial relation data to an arc of the third binomial relation data when the third binomial relation data has second term data which have not been searched and continuing the search;

associating second term data of the third binomial relation data as a second child node with the first term data of the third binomial relation data as a second parent node, adding a relation type of the third binomial relation data to an arc of the third binomial relation data when the third binomial relation data has second term data which have been searched and stopping the search; and stopping the subsequent search when the third binomial relation data including the first term data of the third binomial relation data identical to the second term data of the second binomial relation data has not searched or the third binomial relation data has no second term data.

6. A method according to claim 1, wherein the first term data and the second term data of the binomial relation data stored in the first storage unit have a hierarchical structure, and the (h) repeating includes searching the set of the binomial relation data in the first storage unit for third binomial relation data including first term data of the third binomial relation data identical to second term data of the second binomial relation data or belonging to the second term data of the second binomial relation data by referring to the position data in the second storage unit.

7. A method according to claim 1, wherein the first term data and the second term data of the binomial relation data stored in the first storage unit have a hierarchical structure, and the (h) repeating includes searching the set of the binomial relation data in the first storage unit for third binomial relation data including first term data of the third binomial relation data identical to second term data of the second binomial relation data or belonging to the second term data of the second binomial relation data by referring to the position data in the second storage unit and checking whether the third binomial relation data has been searched.

8. A method according to claim 5, further comprising:

selecting one node from a plurality of nodes when the plurality of nodes having same data exists;

redirecting the plurality of nodes other than the selected node to the selected node; and deleting the plurality of nodes other than the selected node.

9. A method according to claim 1, further comprising:

generating a flow chart whose root is the first parent node by connecting the first child node to the partial tree; and generating a work flow by selecting one node from a plurality of nodes of the flow chart when the plurality of nodes having same data exists, redirecting the plurality of nodes other than the selected node to the selected node, and deleting the plurality of nodes other than the selected node.

10. A flow data generation apparatus, comprising:

a first unit storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;

a second unit extracting first binomial relation data including first term data to be a start point of flow data from the set of binomial relation data in the first storage unit;

a third unit associating the start point as a first parent node with second term data of the first binomial relation data as a first child node;

a fourth unit adding a relation type of the first binomial relation data to an arc of the first binomial relation data;

a fifth unit searching the set of the binomial relation data in the first storage unit for third binomial relation data including first term data identical to second term data of second binomial relation data by referring to the position data in the second storage unit;

a sixth unit associating the first term data of the third binomial relation data as a second parent node with second term data of the third binomial relation data as a second child node;

a seventh unit adding a relation type of the third binomial relation data to an arc of the third binomial relation data;

an eighth unit repeating the searching in the fifth unit, associating in the six unit, and adding in the seventh unit to generate a partial tree including a root identical to the second term data of the first binomial relation data; and a display unit configured to display the partial tree.

11. An apparatus according to claim 10, wherein the eighth unit stops the searching in the fifth unit based on the third binomial relation data when the third binomial relation data has no second term data or the third binomial relation data including the first term data identical to the second term data of the second binomial relation data has not been found.

12. An apparatus according to claim 10, wherein the second unit includes:

a ninth unit generating a matrix comprising a plurality of matrix elements having first matrix elements having data "0" defined by first row elements corresponding to the first term data and first column elements corresponding to the second term data, and second matrix elements having other than data "0" defined by other than the first row elements and first column elements when each row is assigned to first term data and each column is assigned to second term data;

a tenth unit selecting data corresponding to one or a plurality of second row elements having a column sum "0" as one or a plurality of start point candidates;

an eleventh unit selecting the start point from the start point candidates if the plurality of start point candidates exist; and a twelfth unit determining the start point candidate as the start point if one start point candidate exist or determining the start point by a predetermined procedure if no start point candidate exists.

13. A flow data generation apparatus, comprising:

a first unit storing, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;

a second unit extracting first binomial relation data including first term data to be a first start point candidate of flow data from the set of binomial relation data in the first storage unit;

a third unit associating the first start point candidate as a first parent node with second term data of the first binomial relation data as a first child node;

a fourth unit adding a relation type of the first binomial relation data to an arc of the first binomial relation data;

a fifth unit searching the set of the binomial relation data in the first storage unit for third binomial relation data including first term data identical to second term data of the second binomial relation data by referring to the position data in the second storage unit;

a sixth unit associating the first term data of the third binomial relation data as a second parent node with second term data of the third binomial relation data as a second child node;

a seventh unit adding a relation type of the third binomial relation data to an arc of the third binomial relation data;

an eighth unit repeating the searching in the fifth unit, associating in the sixth unit, and adding in the seventh unit to generate a first partial tree including a first root identical to the second term data of the first binomial relation data;

a ninth unit generating a first data tree including a second root identical to the first start point candidate based on the first partial tree;

a tenth unit extracting fourth binomial relation data including first term data to be a second start point candidate of flow data from the set of binomial relation data in the first storage unit;

an eleventh unit associating the second start point candidate as a third parent node with second term data of the fourth binomial relation data as a third child node;

a twelfth unit adding a relation type of the fourth binomial relation data to an arc of the fourth binomial relation data;

a thirteenth unit repeating the searching in the fifth unit, associating in the sixth unit, and adding in the seventh unit to generate a second partial tree including a third root identical to the second term data of the fourth binomial relation data;

a fourteenth unit generating a second data tree including a fourth root identical to the second start point candidate based on the second partial tree;

a fifteenth unit selecting one candidate from the first and second start point candidates as the start point;

a sixteenth unit associating the start point and the defeated start point candidate, adding a relation type of binomial relation data between the start point and the defeated start point candidate to an arc between the start point and the defeated start point candidate, and integrating the first and second data trees into a third data tree; and a display unit configured to display the first and second partial trees.

14. An apparatus according to claim 10, wherein the eighth unit includes a thirteenth unit searching the set of the binomial relation data in the first storage unit for third binomial relation data including first term data of the third binomial relation data identical to second term data of second binomial relation data by referring to the position data in the second storage unit and checking whether the third binomial relation data has been searched;

a fourteenth unit associating second term data of the third binomial relation data as a second child node with the first term data of the third binomial relation data as a second parent node, adding a relation type of the third binomial relation data to an arc of the third binomial relation data when the third binomial relation data has second term data which have not been searched and continuing the search;

a fifteenth unit associating second term data of the third binomial relation data as a second child node with the first term data of the third binomial relation data as a second parent node, adding a relation type of the third binomial relation data to an arc of the third binomial relation data when the third binomial relation data has second term data which have been searched and stopping the search; and a sixteenth unit stopping the subsequent search when the third binomial relation data including the first term data of the third binomial relation data identical to the second term data of the second binomial relation data has not searched or the third binomial relation data has no second term data.

15. An apparatus according to claim 10, wherein the first term data and the second term data of the binomial relation data stored in the first storage unit have a hierarchical structure, and the eighth unit searches the set of the binomial relation data in the first storage unit for third binomial relation data including first term data of the third binomial relation data identical to second term data of the second binomial relation data or belonging to the second term data of the second binomial relation data by referring to the position data in the second storage unit.

16. An apparatus according to claim 10, wherein the first term data and the second term data of the binomial relation data stored in the first storage unit have a hierarchical structure, and the eighth unit searches the set of the binomial relation data in the first storage unit for third binomial relation data including first term data of the third binomial relation data identical to second term data of the second binomial relation data or belonging to the second term data of the second binomial relation data by referring to the position data in the second storage unit and checks whether the third binomial relation data has been searched.

17. An apparatus according to claim 14, further comprising:

a seventeenth unit selecting one node from a plurality of nodes when the plurality of nodes having same data exists;

an eighteenth unit redirecting the plurality of nodes other than the selected node to the selected node; and a nineteenth unit deleting the plurality of nodes other than the selected node.

18. An apparatus according to claim 10, further comprising:

a twentieth unit generating a flow chart whose root is the first parent node by connecting the first child node to the partial tree; and a twenty-first unit generating a work flow by selecting one node from a plurality of nodes of the flow chart when the plurality of nodes having same data exists, redirecting the plurality of nodes other than the selected node to the selected node, and deleting the plurality of nodes other than the selected node.

19. A flow data generation apparatus, comprising:
a processor;
a storage device which can be accessed by the processor;
a first program code which is stored in the storage device and provides the processor with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;
a second program code which is stored in the storage device and provides the processor with a command to extract first binomial relation data including first term data to be a start point of flow data from the set of binomial relation data in the first storage unit;
a third program code which is stored in the storage device and provides the processor with a command to associate the start point as a first parent node with second term data of the first binomial relation data as a first child node;
a fourth program code which is stored in the storage device and provides the processor with a command to add a relation type of the first binomial relation data to an arc of the first binomial relation data;
a fifth program code which is stored in the storage device and provides the processor with a command to search the set of the binomial relation data in the first storage unit for third binomial relation data including first term data identical to second term data of second binomial relation data by referring to the position data in the second storage unit;
a sixth program code which is stored in the storage device and provides the processor with a command to associate the first term data of the third binomial relation data as a second parent node with second term data of the third binomial relation data as a second child node;
a seventh program code which is stored in the storage device and provides the processor with a command to add a relation type of the third binomial relation data to an arc of the third binomial relation data;
an eighth program code which is stored in the storage device and provides the processor with a command to repeat the searching by the fifth program code, associating by the six program code, and adding by the seventh program code to generate a partial tree including a root identical to the second term data of the first binomial relation data; and
a display unit configured to display the partial tree.

20. A flow data generation apparatus, comprising:
a processor;
a storage device which can be accessed by the processor;
a first program code which is stored in the storage device and provides the processor with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;
a second program code which is stored in the storage device and provides the processor with a command to extract first binomial relation data including first term data to be a first start point candidate of flow data from the set of binomial relation data in the first storage unit;
a third program code which is stored in the storage device and provides the processor with a command to associate the first start point candidate as a first parent node with second term data of the first binomial relation data as a first child node;
a fourth program code which is stored in the storage device and provides the processor with a command to add a relation type of the first binomial relation data to an arc of the first binomial relation data;
a fifth program code which is stored in the storage device and provides the processor with a command to search the set of the binomial relation data in the first storage unit for third binomial relation data including first term data identical to second term data of the second binomial relation data by referring to the position data in the second storage unit;
a sixth program code which is stored in the storage device and provides the processor with a command to associate the first term data of the third binomial relation data as a second parent node with second term data of the third binomial relation data as a second child node;
a seventh program code which is stored in the storage device and provides the processor with a command to add a relation type of the third binomial relation data to an arc of the third binomial relation data;
an eighth program code which is stored in the storage device and provides the processor with a command to repeat the searching by the fifth program code, associating by the sixth program code, and adding by the seventh program code to generate a first partial tree including a first root identical to the second term data of the first binomial relation data;
a ninth program code which is stored in the storage device and provides the processor with a command to generate a first data tree including a second root identical to the first start point candidate based on the first partial tree;
a tenth program code which is stored in the storage device and provides the processor with a command to extract fourth binomial relation data including first term data to be a second start point candidate of flow data from the set of binomial relation data in the first storage unit;
an eleventh program code which is stored in the storage device and provides the processor with a command to associate the second start point candidate as a third parent node with second term data of the fourth binomial relation data as a third child node;
a twelfth program code which is stored in the storage device and provides the processor with a command to add a relation type of the fourth binomial relation data to an arc of the fourth binomial relation data;
a thirteenth program code which is stored in the storage device and provides the processor with a command to repeat the searching by the fifth program code, associating by the sixth program code, and adding by the seventh program code to generate a second partial tree including a third root identical to the second term data of the fourth binomial relation data;
fourteenth program code which is stored in the storage device and provides the processor with a command to generate a second data tree including a fourth root identical to the second start point candidate based on the second partial tree;
a fifteenth program code which is stored in the storage device and provides the processor with a command to select one candidate from the first and second start point candidates as the start point;
a sixteenth program code which is stored in the storage device and provides the processor with a command to associate the start point and the defeated start point candidate, add a relation type of binomial relation data between the start point and the defeated start point candidate to an arc between the start point and the defeated start point candidate, and integrate the first and second data trees into a third data tree; and
a display unit configured to display the first and second partial trees.

21. A flow data generation program product which causes a computer system to generate flow data, comprising:
a recording medium;
a first program code which is recorded on the recording medium and provides the computer system with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;
a second program code which is recorded on the recording medium and provides the computer system with a command to extract first binomial relation data including first term data to be a start point of flow data from the set of binomial relation data in the first storage unit;
a third program code which is recorded on the recording medium and provides the computer system with a command to associate the start point as a first parent node with second term data of the first binomial relation data as a first child node;
a fourth program code which is recorded on the recording medium and provides the computer system with a command to add a relation type of the first binomial relation data to an arc of the first binomial relation data;
a fifth program code which is recorded on the recording medium and provides the computer system with a command to search the set of the binomial relation data in the first storage unit for third binomial relation data including first term data identical to second term data of second binomial relation data by referring to the position data in the second storage unit;
a sixth program code which is recorded on the recording medium and provides the computer system with a command to associate the first term data of the third binomial relation data as a second parent node with second term data of the third binomial relation data as a second child node;
a seventh program code which is recorded on the recording medium and provides the computer system with a command to add a relation type of the third binomial relation data to an arc of the third binomial relation data;
an eighth program code which is recorded on the recording medium and provides the computer system with a command to repeat the searching by the fifth program code, associating by the six program code, and adding by the seventh program code to generate a partial tree including a root identical to the second term data of the first binomial relation data; and
a display unit configured to display the partial tree.

22. A flow data generation program product which causes a computer system to generate flow data, comprising:
a recording medium;
a first program code which is recorded on the recording medium and provides the computer system with a command to store, in a first storage unit, a set of binomial relation data including first term data, second term data, and relation types between the first term data and the second term data, and in a second storage unit, position data which are data on position where each value of the first term data and second term data exists in the set of binomial relation data storing in the first storage unit;
a second program code which is recorded on the recording medium and provides the computer system with a command to extract first binomial relation data including first term data to be a first start point candidate of flow data from the set of binomial relation data in the first storage unit;
a third program code which is recorded on the recording medium and provides the computer system with a command to associate the first start point candidate as a first parent node with second term data of the first binomial relation data as a first child node;
a fourth program code which is recorded on the recording medium and provides the computer system with a command to add a relation type of the first binomial relation data to an arc of the first binomial relation data;
a fifth program code which is recorded on the recording medium and provides the computer system with a command to search the set of the binomial relation data in the first storage unit for third binomial relation data including first term data identical to second term data of the second binomial relation data by referring to the position data in the second storage unit;
a sixth program code which is recorded on the recording medium and provides the computer system with a command to associate the first term data of the third binomial relation data as a second parent node with second term data of the third binomial relation data as a second child node;
a seventh program code which is recorded on the recording medium and provides the computer system with a command to add a relation type of the third binomial relation data to an arc of the third binomial relation data;
an eighth program code which is recorded on the recording medium and provides the computer system with a command to repeat the searching by the fifth program code, associating by the sixth program code, and adding by the seventh program code to generate a first partial tree including a first root identical to the second term data of the first binomial relation data;
a ninth program code which is recorded on the recording medium and provides the computer system with a command to generate a first data tree including a second root identical to the first start point candidate based on the first partial tree;
a tenth program code which is recorded on the recording medium and provides the computer system with a command to extract fourth binomial relation data including first term data to be a second start point candidate of flow data from the set of binomial relation data in the first storage unit;
an eleventh program code which is recorded on the recording medium and provides the computer system with a command to associate the second start point candidate as a third parent node with second term data of the fourth binomial relation data as a third child node;

a twelfth program code which is recorded on the recording medium and provides the computer system with a command to add a relation type of the fourth binomial relation data to an arc of the fourth binomial relation data;

a thirteenth program code which is recorded on the recording medium and provides the computer system with a command to repeat the searching by the fifth program code, associating by the sixth program code, and adding by the seventh program code to generate a second partial tree including a third root identical to the second term data of the fourth binomial relation data;

a fourteenth program code which is recorded on the recording medium and provides the computer system with a command to generate a second data tree including a fourth root identical to the second start point candidate based on the second partial tree;

a fifteenth program code which is recorded on the recording medium and provides the computer system with a command to select one candidate from the first and second start point candidates as the start point;

a sixteenth program code which is recorded on the recording medium and provides the computer system with a command to associate the start point and the defeated start point candidate, add a relation type of binomial relation data between the start point and the defeated start point candidate to an arc between the start point and the defeated start point candidate, and integrate the first and second data trees into a third data tree; and a display unit configured to display the first and second partial trees.

\* \* \* \* \*